(12) United States Patent
Pei et al.

(10) Patent No.: US 11,799,546 B2
(45) Date of Patent: *Oct. 24, 2023

(54) OPTICAL FIBER CHARACTERIZATION USING A NONLINEAR SKIRT MEASUREMENT

(71) Applicant: Ciena Corporation, Hanover, MD (US)

(72) Inventors: Yinqing Pei, Kanata (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/437,635

(22) PCT Filed: Mar. 27, 2020

(86) PCT No.: PCT/US2020/025177
§ 371 (c)(1),
(2) Date: Sep. 9, 2021

(87) PCT Pub. No.: WO2020/198574
PCT Pub. Date: Oct. 1, 2020

(65) Prior Publication Data
US 2022/0149938 A1 May 12, 2022

Related U.S. Application Data

(63) Continuation-in-part of application No. 16/365,890, filed on Mar. 27, 2019, now Pat. No. 11,139,633.

(51) Int. Cl.
*H04B 10/27* (2013.01)
*H04B 10/079* (2013.01)

(52) U.S. Cl.
CPC .............. *H04B 10/07951* (2013.01)

(58) Field of Classification Search
None
See application file for complete search history.

(56) References Cited

U.S. PATENT DOCUMENTS 9,344,193 B2 5/2016 Boertjes et al.
9,577,763 B2 2/2017 Al Sayeed et al.
(Continued)

FOREIGN PATENT DOCUMENTS

CN 101959750 A * 1/2011 ............. H04B 10/08
CN 103900796 A * 7/2014 ............. G01M 11/02
(Continued)

OTHER PUBLICATIONS

A. Melloni et al., Frequency characterization of the nonlinear refractive index in optical fiber, Jan. 1999, pp. 1-11.
(Continued)

*Primary Examiner* — Mark Hellner
(74) *Attorney, Agent, or Firm* — Baratta Law PLLC; Lawrence A. Baratta, Jr.

(57) ABSTRACT

Systems and methods include causing transmission of one or more shaped Amplified Spontaneous Emission (ASE) signals, from an ASE source (70), on an optical fiber (58, 60); obtaining received spectrum of the one or more shaped ASE signals from an optical receiver (68) connected to the optical fiber (58, 60); and characterizing the optical fiber (58, 60) based in part on one or more of a nonlinear skirt and a center dip depth in the received spectrum of the one or more shaped ASE signals. The one or more shaped ASE signals can be formed by the ASE source (70) communicatively coupled to a Wavelength Selective Switch (WSS) (62) that is configured to shape ASE from the ASE source to form the one or more shaped ASE signals with one or two or multiple peaks and with associated frequency.

20 Claims, 19 Drawing Sheets

(56) References Cited

U.S. PATENT DOCUMENTS

| | | | |
|---|---|---|---|
| 9,680,569 B2 | 6/2017 | Archambault et al. | |
| 9,755,776 B2 | 9/2017 | Boertjes et al. | |
| 9,847,831 B2 | 12/2017 | Archambault et al. | |
| 9,973,295 B2 | 5/2018 | Al Sayeed et al. | |
| 10,161,798 B2 | 12/2018 | Pei et al. | |
| 10,200,145 B2 | 2/2019 | Boertjes et al. | |
| 2002/0118440 A1 | 8/2002 | Lin et al. | |
| 2018/0343077 A1 | 11/2018 | Al Sayeed et al. | |
| 2019/0028198 A1* | 1/2019 | Schmidtke | H04J 14/0201 |

FOREIGN PATENT DOCUMENTS

| | | | | |
|---|---|---|---|---|
| CN | 109450542 | * | 3/2019 | ............ H04B 10/60 |
| JP | 3976733 B2 | * | 9/2007 | ........ G01M 11/3172 |

OTHER PUBLICATIONS

Agilent Technologies, Agilent 86038B Photonic Dispersion and Loss Analyzer User's Guide, Second Edition, Jul. 2006, pp. 1-350.

M. Ohashi, Intech, Fiber Measurement Technique Based on OTDR, Chapter 19, 2013, pp. 512-539.

X. Bao et al., sensors ISSN 1424-8220, Recent Progress in Brillouin Scattering Based Fiber Sensors, Sensors 2011, 11, 4152-4187; doi:10.3390/s110404152, Published Apr. 7, 2011, pp. 4153-4187.

E.M. Dianov et al., Applied Physics B, Long-Range Interaction of Picosecond Solitons Through Excitation of Acoustic Waves in Optical Fibers, Appl. Phys. B 54, 1992, pp. 175-180.

R. Hui et al., Journal of Lightwave Technology, Characterization of Electrostriction Nonlinearity in a Standard Single-Mode Fiber Based on Coherent Detection and Cross-Phased Modulation, IEEE, 0733-8724, 2015, pp. 1-7.

Dorrer, "Characterization of chromatic dispersion using gated amplified spontaneous emission", Optical Fiber Communication Conference, IEEE, Feb. 23, 2004, pp. 1-3.

Nicholson et al., "Characterization of higher-order-mode content in large-mode-area fibers", Lasers and Electro-Optics, IEEE, May 4, 2008, OSA/CLEO/QELS, pp. 1-2.

Aug. 3, 2020, International Search Report and Written Opinion for International Application No. PCT/US2020/025177.

* cited by examiner

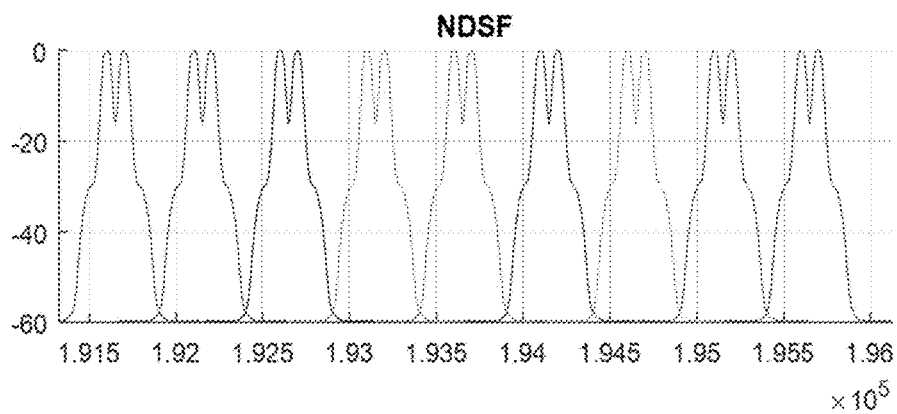
FIG. 3C
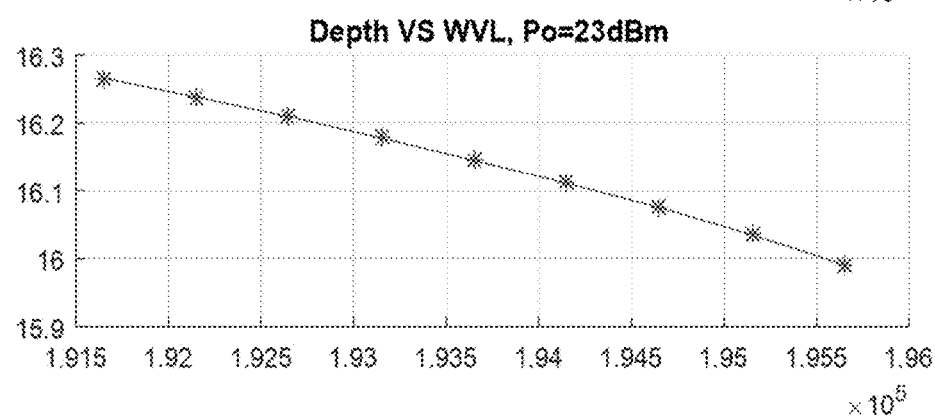
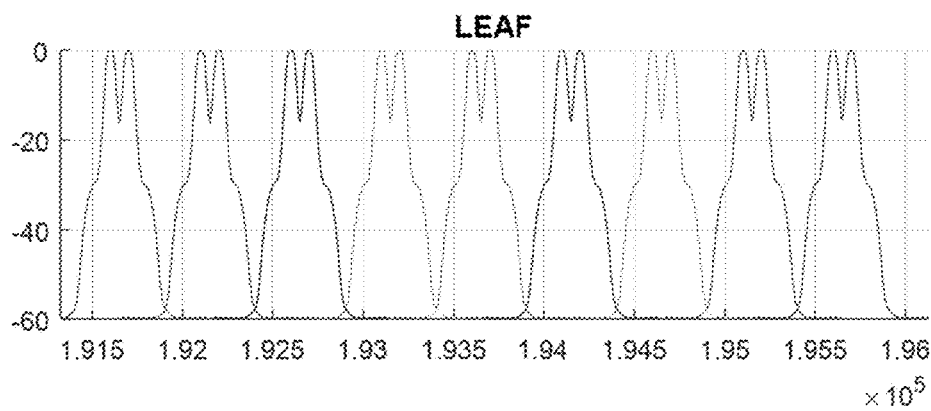
FIG. 3D
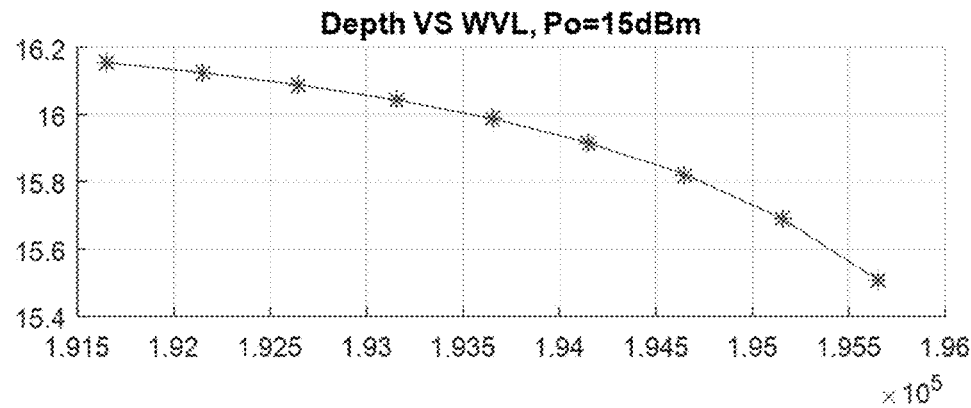

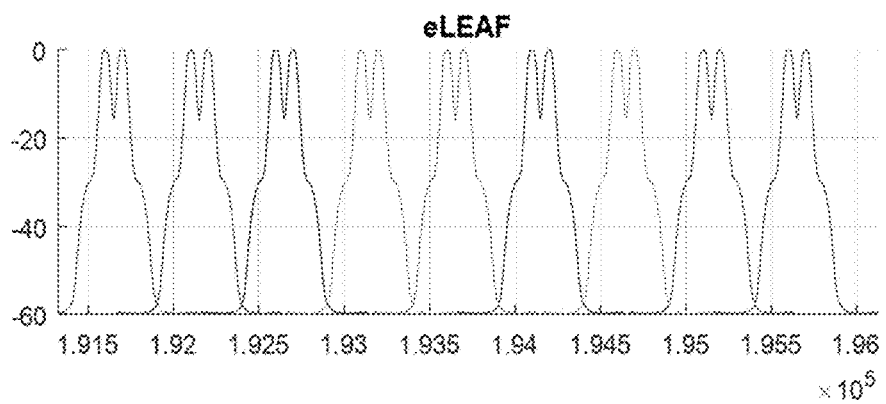
FIG. 3E
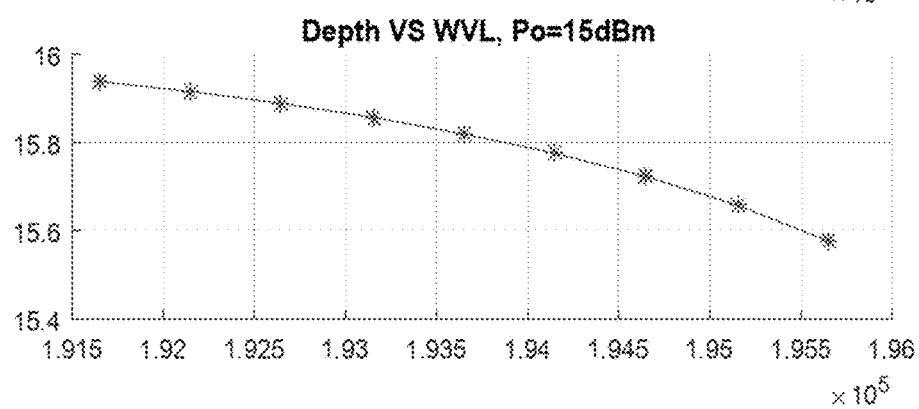
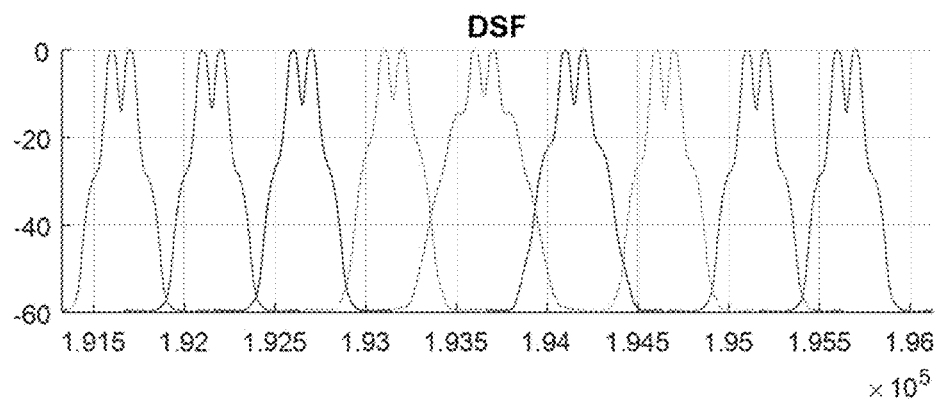
FIG. 3F
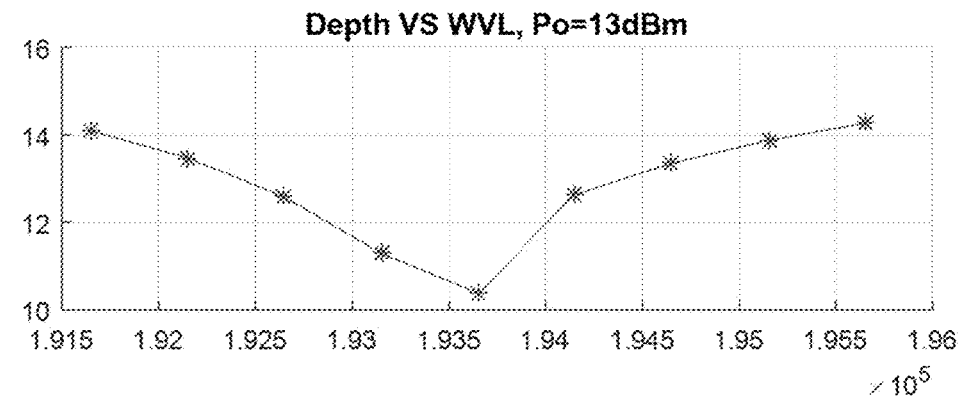

OPTICAL FIBER CHARACTERIZATION USING A NONLINEAR SKIRT MEASUREMENT

CROSS-REFERENCE TO RELATED APPLICATION(S)

The present disclosure is a continuation-in-part of U.S. patent application Ser. No. 16/365,890, filed Mar. 27, 2019, and entitled "In-situ fiber characterization using nonlinear skirt measurement," the contents of which are incorporated herein by reference.

FIELD OF THE DISCLOSURE

The present disclosure generally relates to fiber optic systems. More particularly, the present disclosure relates to systems and methods for optical fiber characterization using a nonlinear skirt measurement.

BACKGROUND OF THE DISCLOSURE

In optical systems, signal transmission performance is significantly impacted by optical fiber dispersion and nonlinearity. It is important to characterize fiber nonlinear parameters for modeling, link budgeting, and performance optimization. Traditionally, fiber characterization for nonlinearity only concerns the propagation coefficient, $\beta$ (specifically the second derivative, or group velocity dispersion parameter, $\beta_2$), and the fiber nonlinear coefficient, $\gamma$, of a single piece of homogeneous fiber without lumped losses at the input, output, or within the fiber. The Group Velocity Dispersion (GVD) parameter, i.e., $\beta_2$, and fiber nonlinear coefficient, i.e., $\gamma$, are among the most critical fiber characteristics for photonic line system link budget, performance modeling, and optimization. The current fiber nonlinearity measurement can be with a high-power signal having a narrow linewidth or by backing out from a Stimulated Raman Sscattering (SRS) measurement. The dispersion measurement, currently, is commonly implemented by measuring the phase delay difference of modulated signals on different wavelengths. For example, dispersion can also be measured by the differential time delay between two wavelengths such as an Optical Service Channel (OSC) wavelength at 1510 nm and an Optical Time Domain Reflectometer (OTDR) wavelength at 1625 nm.

Disadvantageously, Continuous Wave (CW) signals are single polarization sources by definition. This causes measurement issues in the presence of Polarization Dependent Gain (PDG), Differential Group Delay (DGD), and Polarization Mode Dispersion (PMD) which is significant in real systems. In addition, the practical implementation using CW source(s) for dispersion/nonlinear measurement requires a coherent transponder, transceiver, modem, etc. This requires equipped modules as well as end-to-end communication. This may not be available at or before turn-up. Also, the dispersion measurement using two wavelengths such as 1510 nm and 1625 nm only measures average dispersion at 1568 nm. As optical systems continue to push the limit of bandwidth over fiber, it is critical to get accurate measurements over the entire signal band.

Of note, it is not uncommon that optical fibers in the field include multiple fiber segments in a single "span" due to fiber patch or repair or intentional "glass-through" sites, where in general different fiber types may be used in each segment. Additionally, unknown lumped losses at the input and output of the fiber due to patch panels can make it difficult to determine the nonlinear performance since the exact launch power into the span may be unknown. The lumped losses due to patch panels and between the segments and the transition of fiber types will significantly impact the transmission performance of a fiber span. Disadvantageously, there is no known technique to accurately characterize and model multi-segment/mixed fiber spans with unknown lumped losses in a photonic system.

BRIEF SUMMARY OF THE DISCLOSURE

In an embodiment, a system includes a processor communicatively coupled to an Amplified Spontaneous Emission (ASE) source and an optical receiver, wherein the processor is configured to cause transmission of one or more shaped ASE signals, from the ASE source, on an optical fiber, obtain received spectrum of the one or more shaped ASE signals from the optical receiver connected to the optical fiber, and characterize the optical fiber based in part on one or more of a nonlinear skirt and a center dip depth in the received spectrum of the one or more shaped ASE signals. The one or more shaped ASE signals can be formed by the ASE source communicatively coupled to a Wavelength Selective Switch (WSS) that is configured to shape ASE from the ASE source to form the one or more shaped ASE signals with one or more peaks and with associated frequency. The one or more shaped ASE signals can have two distinct peaks at the transmission with a significant dip at a center frequency, and the received spectrum of the one or more two-peak ASE signals has much less of a dip that the center dip depth. The processor can be further configured to determine a fiber type based on a signature of the one or more of the nonlinear skirt and the center dip depth in the received spectrum of the one or more shaped ASE signals. The optical fiber can be characterized to determine effective Group Velocity Dispersion (GVD) parameter, $\beta_2$, and fiber nonlinear coefficient, $\gamma$.

The GVD parameter, $\beta_2$, and the fiber nonlinear coefficient, $\gamma$, can be characterized by a measurement of a shape of the one or more of the nonlinear skirt and the center dip depth as a function of signal wavelength. The one or more shaped ASE signals can include a plurality of shaped ASE signals with a first set of shaped ASE signals utilized to determine launch power for every span in a section to yield an optimum center dip depth, and a second set of shaped ASE signals that sweep at different frequencies across a signal band to determine a corresponding center dip depth at the different frequencies. The optical fiber can be characterized based in part on a shape of the one or more of the nonlinear skirt and the center dip depth and a separate differential delay measurement, to determine the GVD parameter, $\beta_2$, and fiber nonlinear coefficient, $\gamma$. The optical fiber can be characterized based in part on a shape of the one or more of the nonlinear skirt and the center dip depth and a separate Stimulated Raman Scattering (SRS) measurement, to determine the GVD parameter, $\beta_2$, and fiber nonlinear coefficient, $\gamma$. The optical fiber can be characterized based in part on a shape of the one or more of the nonlinear skirt and the center dip depth and a Least Mean Square (LMS) fit, to determine the GVD parameter, $\beta_2$, and fiber nonlinear coefficient, $\gamma$.

In another embodiment, a method includes causing transmission of one or more shaped Amplified Spontaneous Emission (ASE) signals, from an ASE source, on an optical fiber; obtaining received spectrum of the one or more shaped ASE signals from the optical receiver connected to the optical fiber; and characterizing the optical fiber based in part on one or more of a nonlinear skirt and a center dip depth in the received spectrum of the one or more two-peak ASE signals. The one or more shaped ASE signals can be formed by the ASE source communicatively coupled to a Wavelength Selective Switch (WSS) that is configured to shape ASE from the ASE source to form the one or more shaped ASE signals with one or more peaks and with associated frequency. The one or more shaped ASE signals can have two distinct peaks at the transmission with a significant dip at a center frequency, and the received spectrum of the one or more two-peak ASE signals has much less of a dip that the center dip depth. The method can further include determining a fiber type based on a signature of the one or more of the nonlinear skirt and the center dip depth in the received spectrum of the one or more shaped ASE signals.

The optical fiber can be characterized to determine the GVD parameter, $\beta_2$, and fiber nonlinear coefficient, $\gamma$. The one or more shaped ASE signals can include a plurality of shaped ASE signals with a first set of shaped ASE signals utilized to determine launch power for every span in a section to yield an optimum center dip depth, and a second set of shaped ASE signals that sweep at different frequencies across a signal band to determine a corresponding center dip depth at the different frequencies. The optical fiber can be characterized based in part on a shape of the one or more of the nonlinear skirt and the center dip depth and a separate differential delay measurement, to determine the GVD parameter, $\beta_2$, and fiber nonlinear coefficient, $\gamma$. The optical fiber can be characterized based in part on a shape of the one or more of the nonlinear skirt and the center dip depth and a separate Stimulated Raman Scattering (SRS) measurement, to determine the GVD parameter, $\beta_2$, and fiber nonlinear coefficient, $\gamma$. The optical fiber can be characterized based in part on a shape of the one or more of the nonlinear skirt and the center dip depth and a Least Mean Square (LMS) fit, to determine the GVD parameter, $\beta_2$, and fiber nonlinear coefficient, $\gamma$.

In a further embodiment, an Optical Add/Drop Multiplexing (OADM) node includes a Wavelength Selective Switch (WSS) system communicatively coupled to at least a first optical fiber and a second optical fiber; an Amplified Spontaneous Emission (ASE) source connected to the WSS system; a pre-amplifier connected to the WSS system and the first optical fiber; an Optical Channel Monitor (OCM) connected at least to an output of the pre-amplifier; and a processor configured to obtain received spectrum of one or more shaped ASE signals from the OCM, wherein the one or more shaped ASE signals are transmitted over the first optical fiber, and characterize the first optical fiber based in part on a nonlinear skirt shape and a center dip depth in the received spectrum of the one or more shaped ASE signals.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3C is a graph of simulated results for received spectrum in NDSF fiber, FIG. 3D is a graph of simulated results for received spectrum in Large Effective Area Fiber (LEAF), FIG. 3E is a graph of simulated results for received spectrum in enhanced LEAF (eLEAF), and FIG. 3F is a graph of simulated results for Dispersion Shifted Fiber (DSF);

DETAILED DESCRIPTION OF THE DISCLOSURE

Figure 1A:
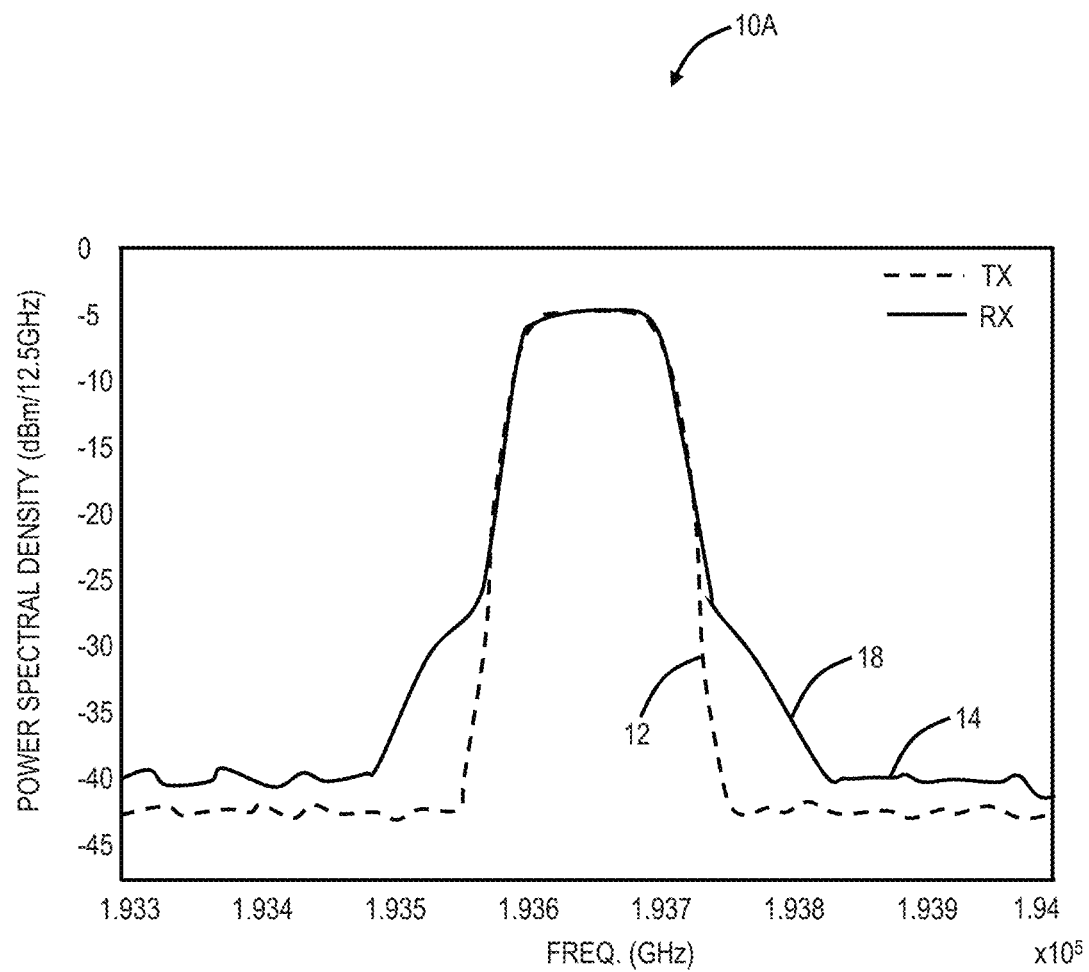
FIG. 1A is a graph of an optical signal and associated signal broadening over 100 km in Lambda Shifted (LS) fiber utilizing a one-peak signal.

The present disclosure relates to systems and methods for fiber characterization using a nonlinear skirt measurement. The present disclosure characterizes fiber dispersion and nonlinearity based on the spectral shape of an Amplified Spontaneous Emission (ASE) signal. Of note, the ASE signal is more like a coherent, dual-polarization modulated signal than a single polarization CW source. The ASE signal can explore all states of polarization which averages these effects resulting in a more stable and accurate measurement. Also, the ASE signal is available from common infrastructure in a photonic line system without requiring additional equipment, and this can be utilized on a per section basis prior to system turn-up. For example, next-generation photonic line systems utilize ASE for channel holders and/or can generate ASE via amplifiers. An ASE source can be shaped by a Wavelength Selective Switch (WSS) at Tx. At a corresponding Rx, the nonlinear product can be characterized by the nonlinear skirt, i.e., spectral shape of the ASE signal. In an example, a two-peak Tx signal spectral shape is designed using an ASE source and transmitted over the fiber. Of note, other shapes are also contemplated such as a one-peak Tx signal. At a corresponding Rx, the nonlinear product can be characterized by center dip depth, i.e., the relative power difference between the signal peak and the valley of the overlap area of the nonlinear skirt between the two peaks. As a result, the measurement depends on relative power between the peak and valley of the two-peak signal. Absolute power accuracy and power monitor Wavelength Dependent Loss (WDL) are not critical requirements for the measurement.

In an embodiment, the present disclosure is characterized as in-situ due to utilizing existing common infrastructure in an optical networking system; no specialized hardware is required. In another embodiment, the present disclosure is implemented in test equipment that may be separate from common infrastructure of the optical networking system. The present disclosure measures dispersion and nonlinearity within the signal band (e.g., the C-band such as between about 1528 nm and 1565 nm, and/or the L-band such as between about 1565 nm and 1625 nm) rather than relying on out-of-band measurements and extrapolation. The present disclosure utilizes a relative power measurement, such that measurement can be easily carried out and post-processing is not complicated.

The accurate characterization of fiber dispersion and nonlinearity will help model the exact link performance, which is crucial for link budget and performance optimization. This is a key part of a "plug and play" approach for optical control. A fiber-type determination is currently a manual procedure and has been shown to be a source of system issues in many networks where there is often mis-provisioned fiber type. This disclosure removes the manual effort of fiber type identification and provisioning and the associated potential manual error. Furthermore, fiber-type does not accurately characterize the fiber. Even within each fiber type, there is a range of dispersion and nonlinear coefficient. It is also common in real systems to have mixed fiber types within a single span. This disclosure gives an appropriate value, averaged over the nonlinear-length, for the key performance parameters which can be used in optical control an optimization resulting in better performance and higher capacity.

When an optical signal propagates in a nonlinear medium such as optical transmission fiber, the signal spectrum will be broadened due to the combination of fiber nonlinearity and dispersion. The broadened spectral shape shows a distinct signature for fiber with different characteristics. Consequently, $\beta_2$ and $\gamma$ can be backed out through measurement and then calculated. This disclosure proposes a process that characterizes $\beta_2$ and $\gamma$ by measuring the broadened spectrum of a shaped ASE signal.

Additionally, the nonlinear skirt measurement can be used to address the challenge of the multi-segment/mixed fiber spans with unknown lumped losses. Instead of characterizing $\gamma$ and $\beta_2$ of individual homogeneous fibers and modeling them separately, the nonlinear skirt measurement can be used to characterize any concatenation of fiber spans with or without lumped losses and mixed fiber types where we treat the concatenation of fibers and losses as a single "effective" span of fiber. Because it is an in-situ measurement, any lumped losses and changes of fiber type that the ASE probe experiences is the same as the transmitted signal. The nonlinear parameters backed out from the nonlinear effect on the ASE probe describe the nonlinear behavior of the fiber span including the effects due to the change of fiber types and lumped losses. Therefore, the outputs of the nonlinear skirt measurement can be generalized as effective nonlinear coefficient, $\gamma_{eff}$, and effective GVD parameter, $\beta_{2,eff}$. With the effective parameters, a fiber span with any condition, including multi-segment, heterogeneous spans with arbitrary lumped losses in the general case can be modeled as a single effective span. The proposed effective fiber parameters and effective span modeling process provide a simple procedure for fiber characterization and accurate prediction for transmission performance of any fiber span condition.

The nonlinear skirt measurement provides a measurement approach for the normal fiber nonlinear parameters (fiber nonlinear coefficient, $\gamma$, and GVD parameter, $\beta_2$), the present disclosure also proposes generalized effective parameters (effective fiber nonlinear coefficient, $\gamma_{eff}$, and effective GVD parameter, $\beta_{2,eff}$) that include any lumped losses at patch points as well as change of fiber types over a fiber span. Taking both effective parameters together, it is possible to model any fiber span, mixed fiber or not, patched or not, as if it were a single piece of fiber with no lumped losses. Thus, with the new parameters and modeling approach, any lumped losses and change of fiber types in a single fiber span can be easily taken into account, which greatly simplify fiber characterization measurement and modeling for fiber transmission performance.

An objective of the present disclosure is to replace the physical fiber model with an equivalent fiber for each span which describes fiber span non-linear transmission behavior. Specifically, in an embodiment, the present disclosure includes a generalized procedure for characterizing and modeling nonlinear performance of individual fiber spans regardless of fiber condition, i.e., the procedure inherently deals with arbitrary lumped losses and/or changes of fiber types within the fiber span.

Figure 1B:
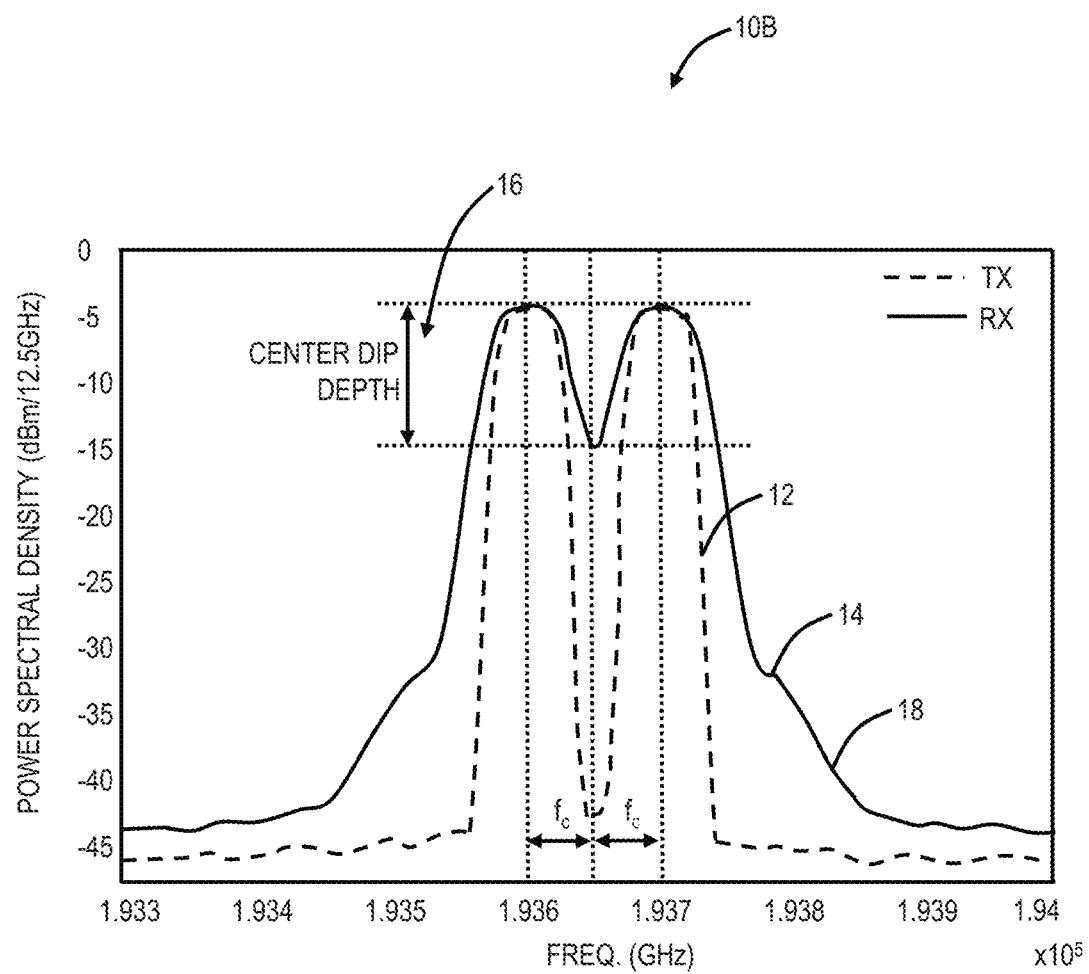
FIG. 1B is a graph of another optical signal utilizing a two-peak signal.

FIG. 1A is a graph 10A of an optical signal and associated signal broadening over 100 km in Lambda Shifted (LS) fiber illustrating a one-peak signal. FIG. 1B is a graph 10B similar to FIG. 1A illustrating a two-peak signal. A spectral shape of the Tx signal is illustrated by line 12 in the graph 10A, 10B, and the Rx signal after a 100 km LS span is illustrated by a line 14 in the graph 10A, 10B. Of note, the graphs 10A, 10B illustrate the Tx signal and the Rx signal on the same graph for illustration purposes to highlight the difference in the spectral shapes based on transmission over an optical fiber. The nonlinear broadening effect due to the transmission will result in a skirt shape on the Rx signal spectrum, a.k.a. nonlinear skirt 18. That is, when an optical signal is transmitted over fiber, the signal spectrum will be broaden due to the combination of fiber nonlinearity and dispersion, and the received signal shape is different after different type of fibers with different characteristics. Therefore, an LMS fit and the like can be performed to determine the various fiber parameters.

In FIG. 1B, it is observed that the gap between the two peaks, marked as a center dip depth 16 in the graph 10B, becomes shallower after transmission due to the broadening effect. It is discovered as outlined in this disclosure that $\beta_2$ and $\gamma$ can be characterized by measuring center dip depth as a function of signal wavelength.

Of note, the present disclosure performs fiber characterization (e.g., fiber type determination, $\beta_2$ and $\gamma$ measurements, etc. based on sending an ASE signal that is spectrally shaped and measuring the received spectral shape, in particular, the nonlinear skirt. In an example, a two-peak signal as shown in FIG. 1B is utilized where an ASE signal from an ASE source is shaped to form the two peaks. The two-peak signal simplifies measurement and post-processing by providing a relative measurement between the peak and valley of the two peaks. Those of ordinary skill in the art will appreciate it is possible to characterize fiber based on the nonlinear skirt shape of a one-peak signal as shown in FIG. 1A based on LMS fit of the shape of the nonlinear skirt. Further, the present disclosure contemplates other shapes including multiple peaks.

Figure 2A:
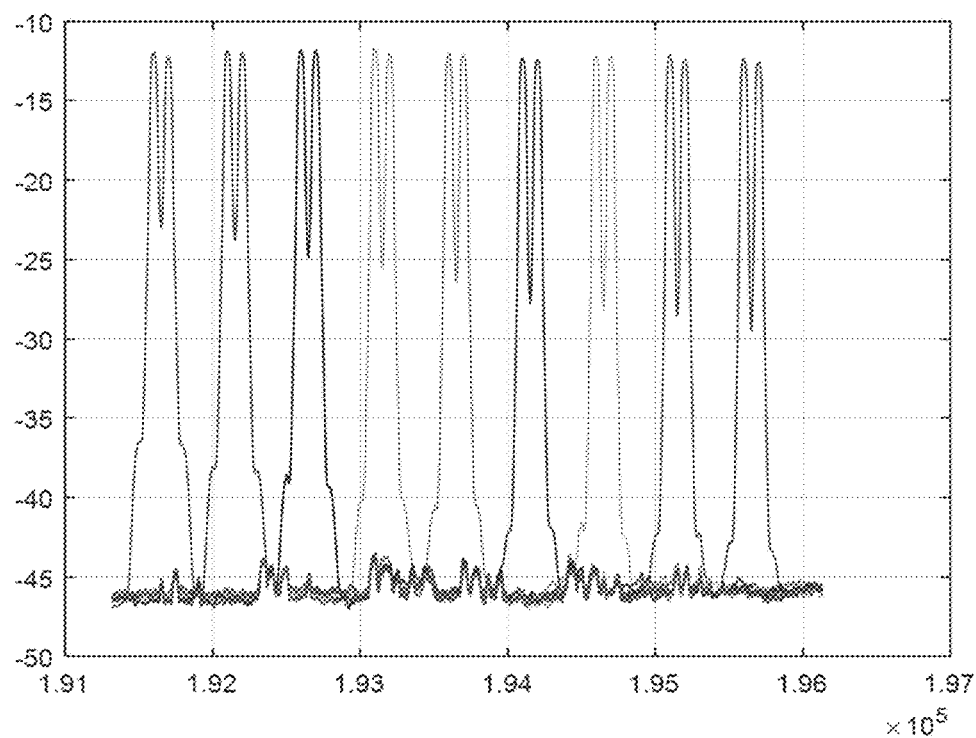
FIG. 2A is a graph of measured results for received spectrum in LS fiber over 100 km.
Figure 2B:
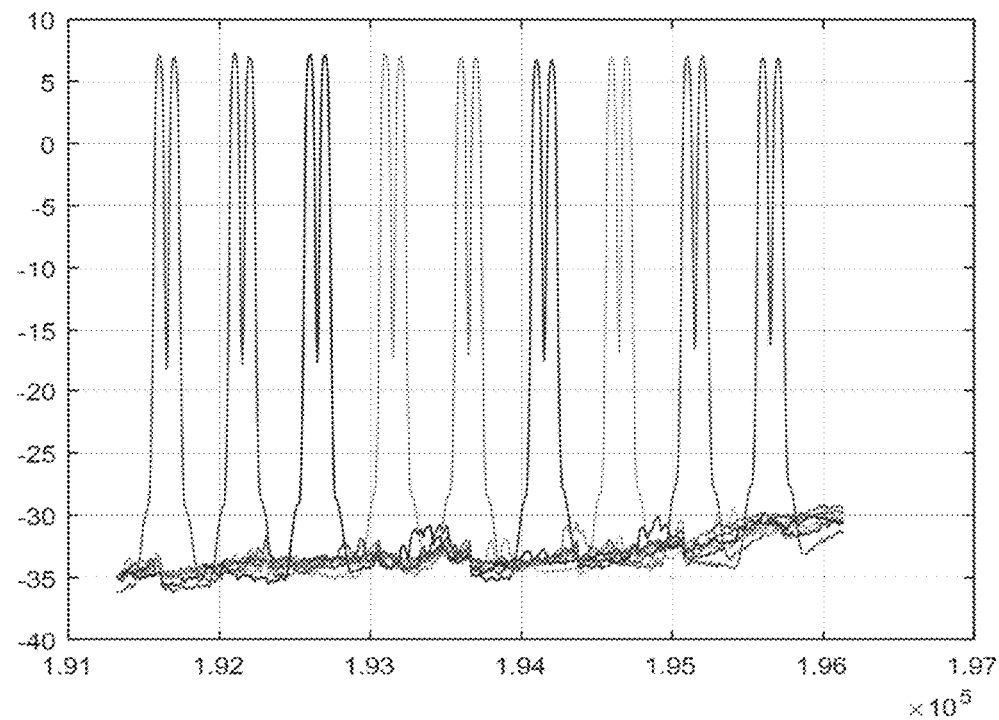
FIG. 2B is a graph of measured results for received spectrum in Non-Dispersion Shifted Fiber (NDSF) over 40 km.
Figure 3A:
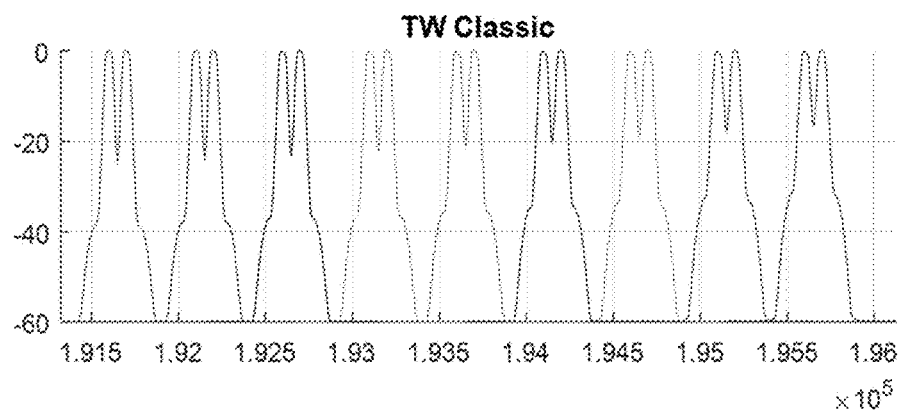
FIG. 3A is a graph of simulated results for received spectrum in Truewave (TW) Classic fiber.
Figure 3A:
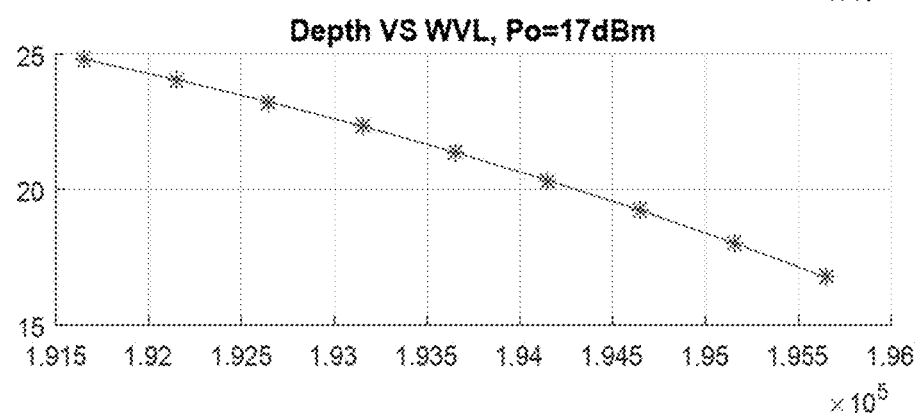
Figure 3B:
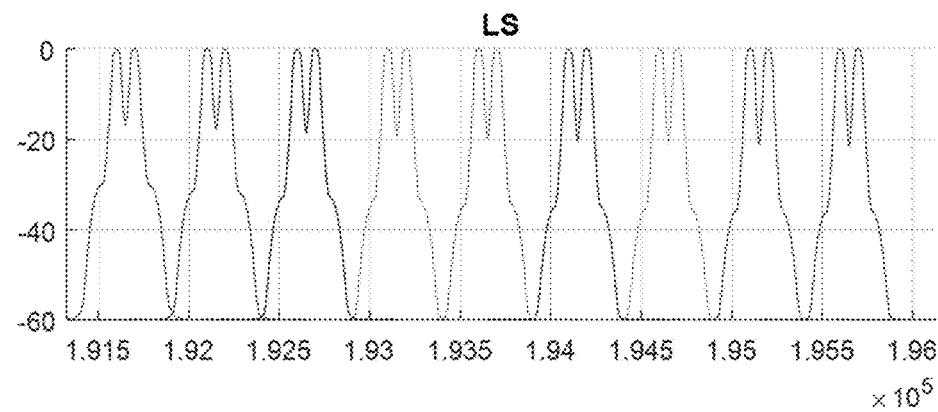
FIG. 3B is a graph of simulated results for received spectrum in LS fiber.
Figure 3B:
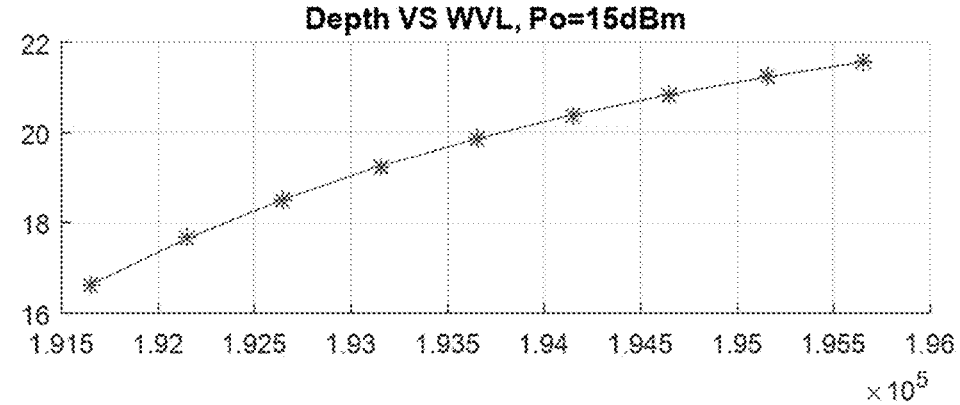

FIG. 2A is a graph of measured results for received spectrum in LS fiber over 100 km, and FIG. 2B is a graph of measured results for received spectrum in Non-Dispersion Shifted Fiber (NDSF) over 40 km. FIG. 3A is a graph of simulated results for received spectrum in Truewave (TW) Classic fiber, FIG. 3B is a graph of simulated results for received spectrum in LS fiber, FIG. 3C is a graph of simulated results for received spectrum in NDSF fiber; FIG. 3D is a graph of simulated results for received spectrum in Large Effective Area Fiber (LEAF), FIG. 3E is a graph of simulated results for received spectrum in enhanced LEAF (eLEAF), and FIG. 3F is a graph of simulated results for Dispersion Shifted Fiber (DSF).

Specifically, the measured/experimental results in FIG. 2 and the simulated results in FIG. 3 illustrate the change of the center dip depth 16 sweeping the signal across the C-band. Distinct signatures are observed for different fiber type with different characteristics. Of note, fiber type can be identified from the change of the center dip depth 16 over wavelength.

Furthermore, an important phenomenon is discovered that given the fiber to be transmitted, the normalized center dip depth over wavelength does not change with different signal launching power. This can be explained by a Gaussian Noise (GN) model, where the nonlinear product of fiber transmission is expressed as[1]

$$G_{NLI}(v, \beta_2, \alpha, L_s, \gamma, P_0) = \qquad (1)$$

$$\frac{16}{27}\gamma^2 P_0^3 \int_{-\infty}^{\infty}\int_{-\infty}^{\infty}\left|\frac{1-e^{-2\alpha L_s}e^{j4\pi^2|\beta_2|L_s(v_1-v)(v_2-v)}}{2\alpha - j4\pi^2|\beta_2|(v_1-v)(v_2-v)}\right|^2 \cdot g_{Tx}(v_1)$$

$$g_{Tx}(v_2)g_{Tx}(v_1+v_2-v)dv_2 dv_1$$

Where $v$ is the frequency, $\beta_2$ is the GVD parameter, $\gamma$ is the nonlinear coefficient, $\alpha$ is the fiber loss parameter, $L_s$ is the span length, $g_{Tx}(\cdot)$ is the normalized power spectral density of the transmitted signal, $P_0$ is its launching power. This is taken from [1] A. Carena, V. Curri, G. Bosco, P. Poggiolini and F. Forghieri, "Modeling of the Impact of Nonlinear Propagation Effects in uncompensated Optical Coherent Transmission Links," in *Journal of Lightwave Technology*, vol. 30, no. 10, pp. 1524-1539, May 15, 2012.

The normalized shape of $G_{NLI}(v)$ is $$g_{NLI}(v, \beta_2, \alpha, L_s) = \qquad (2)$$

$$\int_{-\infty}^{\infty}\int_{-\infty}^{\infty}\left|\frac{1-e^{-2\alpha L_s}e^{j4\pi^2|\beta_2|L_s(v_1-v)(v_2-v)}}{2\alpha - j4\pi^2|\beta_2|(v_1-v)(v_2-v)}\right|^2 \cdot g_{Tx}(v_1)g_{Tx}(v_2)$$

$$g_{Tx}(v_1+v_2-v)dv_2 dv_1$$

which only depends on the term within the absolute operator when $g_{Tx}(\cdot)$ is fixed. The Tx signal spectrum with the two-peak spectral shape designed by this invention has no signal power between the two peaks. Therefore, the Power Spectral Density (PSD) in the center gap at the Rx side contains only nonlinear products plus any ASE generated on the line due to amplifiers on the line. The line-generated ASE can be modeled or measured out-of-band to be removed from the Rx spectrum such that the output spectrum to analyze consists only of the propagated ASE tones plus their nonlinear skirt distortions. When PSD of the in band nonlinear product is negligible compared with signal PSD, the center dip depth, i.e., the delta of PSD between the peak and valley of the two-peak signal, can be written as $$\text{Depth}(\beta_2, P_0, \gamma, L_s, \alpha) = \qquad (3)$$

$$10\log 10\left(\frac{g_{RX}(v_c)}{g_{NLI}(v=0, \beta_2, L_s, \alpha)}\right) + 10\log 10\left(\frac{16}{27}\gamma^2 P_0^2\right) =$$

$$\tilde{D}epth(\beta_2, L_s, \alpha) + A(\gamma, P_0) + C$$

where $v_c$ is the relative center frequency of the each of the two peaks, as marked in FIG. 1B. The first term in Eq (3) is the normalized center dip depth, denoted as $\tilde{D}epth(\beta_2,L_s,\alpha)$; the second term is the offset, denoted as $A(\gamma,P_0)$, and $C=10\log 10(16/27)$.

Figure 4A:
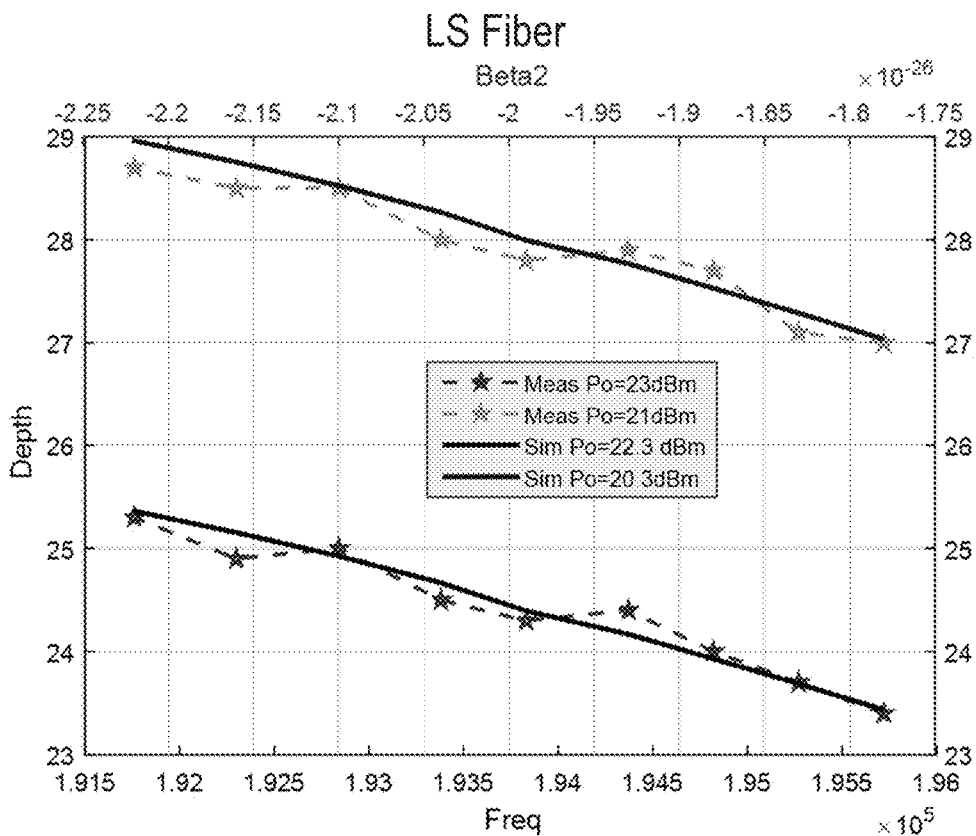
FIG. 4A is a graph of measurement of center gap depth versus frequency versus $\beta_2$ for LS fiber.
Figure 4B:
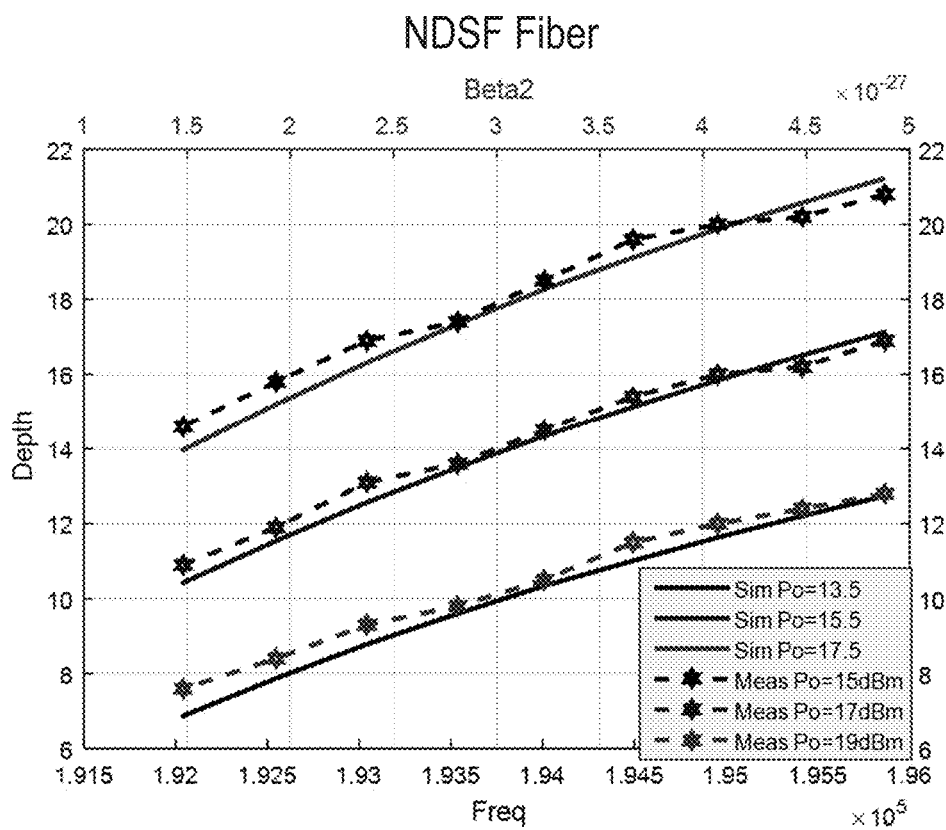
FIG. 4B is a graph of a measurement of center gap depth versus frequency versus $\beta_2$ for NDSF fiber.

FIG. 4A is a graph of measurement of center gap depth versus frequency versus $\beta_2$ for LS fiber, and FIG. 4B is a graph of a measurement of center gap depth versus frequency versus $\beta_2$ for NDSF fiber. Given the fiber span under test, i.e., $L_{eff}$ and $\gamma$ are approximately constant over wavelength, the normalized center dip depth as a function of $\beta_2$, $\tilde{D}epth|_{L_{eff}}(\beta_2)$, remains unchanged with different $P_0$, while the offset, $A(P_0)$, changes twice as fast as $P_0$. Note, the corresponding $\beta_2$ at each frequency on the top X-axis of FIGS. 4A and 4B is computed from measured dispersion and dispersion slope at 1550 nm.

Figure 5:
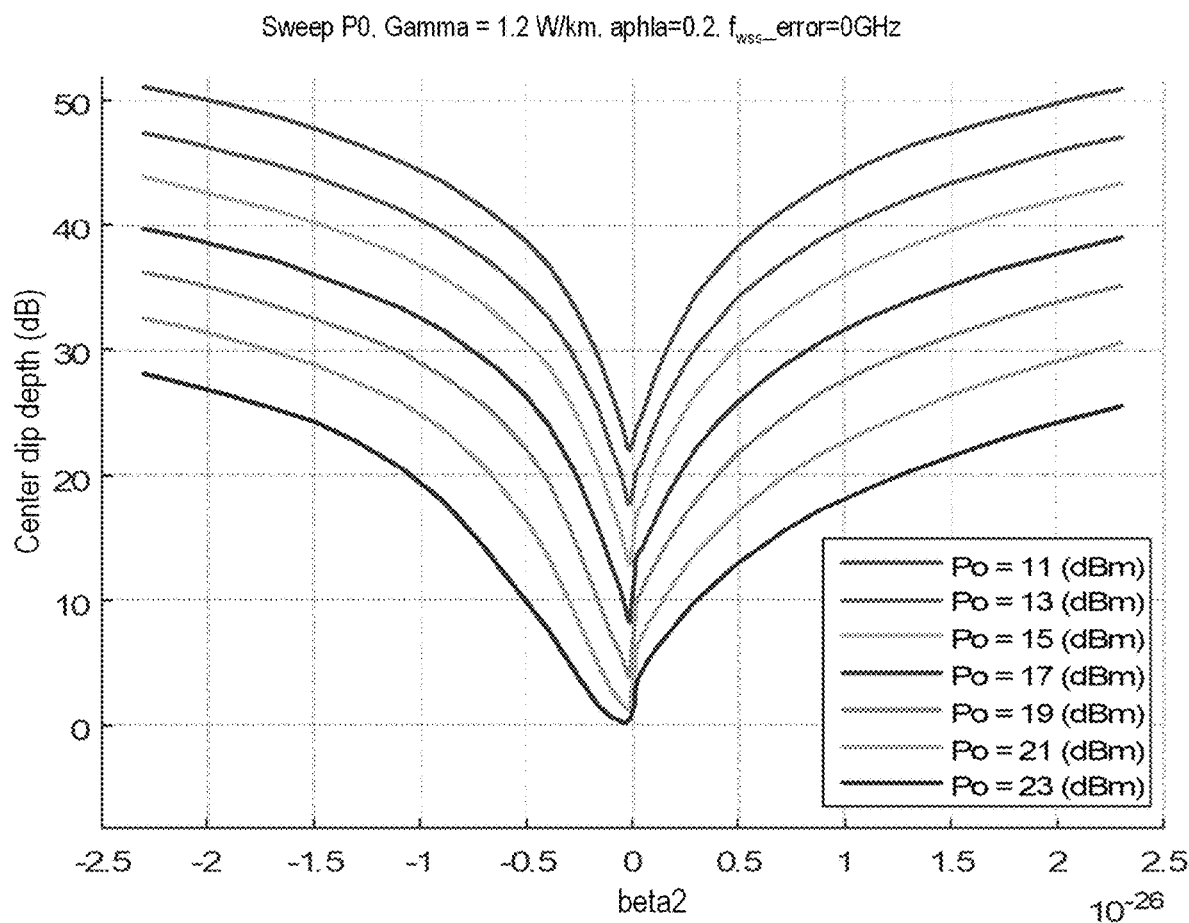
FIG. 5 is a graph of a simulation of center dip depth versus $\beta_2$ with different launching power.
Figure 6:
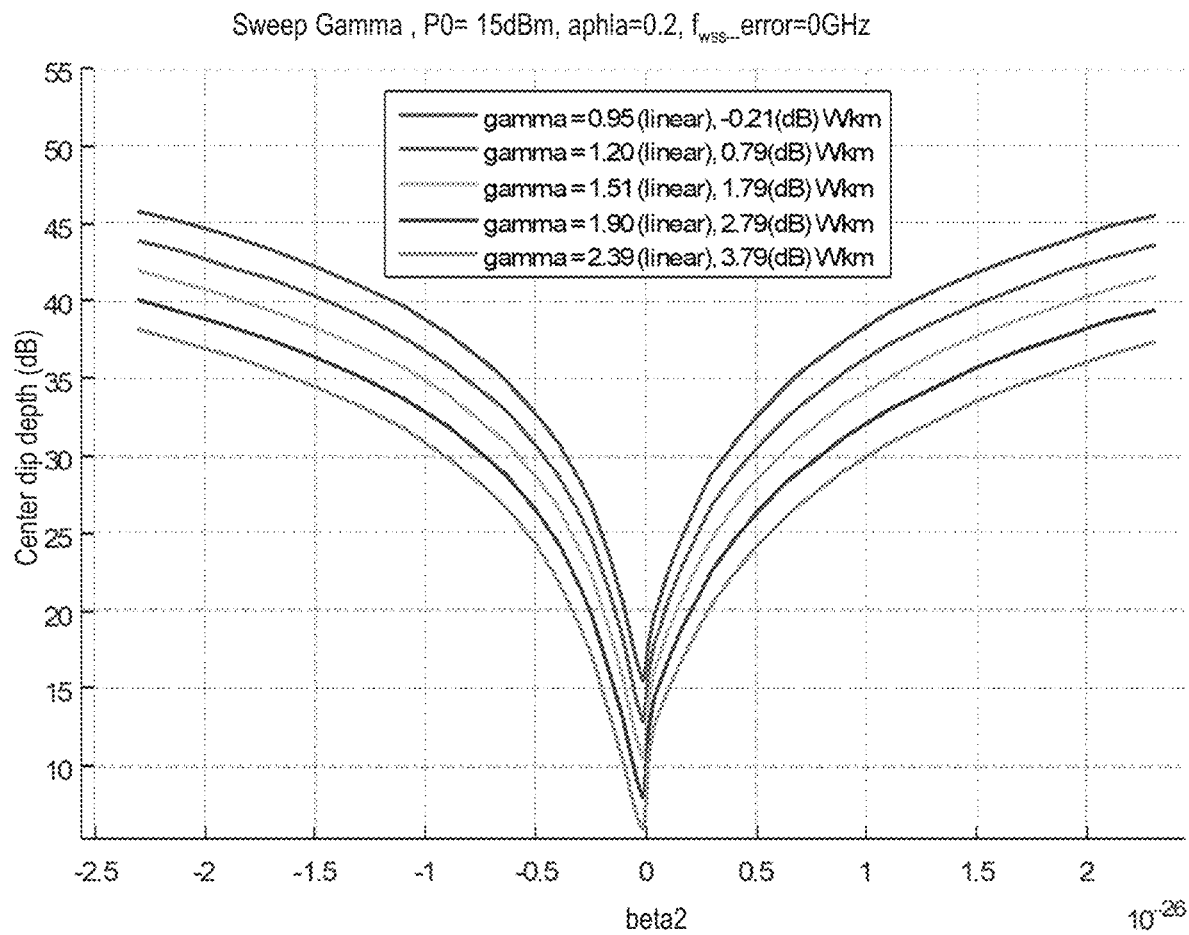
FIG. 6 is a graph of a simulation of center dip depth versus $\beta_2$ with different gamma, $\gamma$.

FIG. 5 is a graph of a simulation of center dip depth versus $\beta_2$ with different launching power. FIG. 6 is a graph of a simulation of center dip depth versus $\beta_2$ with different gamma, $\gamma$. Note, the shape of the $\beta_2$ versus the center dip depth trace remain approximately unchanged when center dip depth is greater than about 15 dB. The center dip depth trace versus $\beta_2$ versus measure can provide the fiber type and dispersion slope. The shape of the center dip depth versus $\beta_2$ changes at different fiber lengths, but is unchanged with different gamma, $\gamma$ at the same fiber length. For detection, the shape of the center dip depth versus $\beta_2$ can be stored at various different fiber lengths for simple comparisons. The simulation results in FIG. 5 demonstrate that, with fixed $\gamma$ and $L_{eff}$, $\tilde{D}epth|_{L_{eff}}(\beta_2)$ remains approximately unchanged with different $P_0$, when the absolute value of Depth is larger than ~15 dB. Depth gets distorted with high $P_0$, when the in band nonlinear product is no longer negligible. FIG. 6 demonstrates that with fixed $P_0$ and $L_{eff}$, $\tilde{D}epth|_{L_{eff}}(\beta_2)$ remains approximately unchanged, while absolute value of Depth changes twice as fast as the change of $\gamma$.

Figure 7:
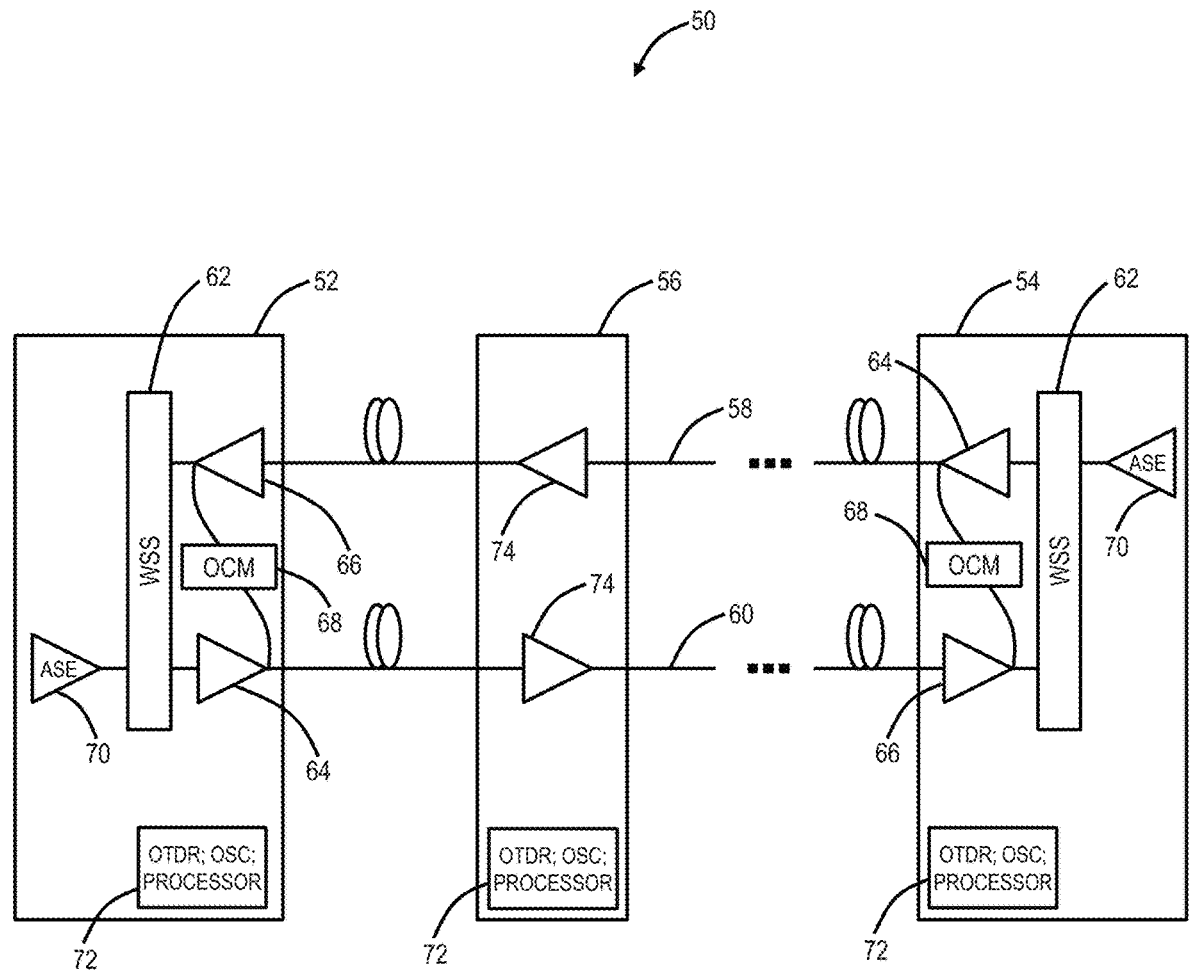
FIG. 7 is a network diagram of an optical section with associated equipment for providing a nonlinear skirt measurement.

Accordingly, the relative center dip depth change over wavelength can be a distinct indicator of the type of fiber (e.g., NSDF, LS, TWc, LEAF, eLEAF, DSF, etc.). No absolute power information is required;

FIG. 7 is a network diagram of an optical section 50 with associated equipment for providing a nonlinear skirt measurement. The optical section 50 is a segment in an optical network between Optical Add/Drop Multiplexer (OADM) nodes 52, 54. The optical section 50 can be referred to as an Optical Multiplex Section (OMS), and one aspect of each optical section 50 is the spectral load is identical over the entire section. A real implementation of an optical network can include multiple optical sections 50 in a mesh, ring, linear, hub and spoke, etc. architecture. The nonlinear skirt measurement can be performed on a per optical section basis. The optical section 50 can also include intermediate optical line amplifier nodes 56. Further, a practical implementation of the optical section 50 includes two optical fibers 58, 60 for bidirectional communication. The nonlinear skirt measurement is performed on each optical fiber 58, 60 separately.

The OADM nodes 52, 54 include a Wavelength Selective Switch (WSS) 62 that faces the optical fibers 58, 60. The WSS 62 forms an optical degree that faces the optical fibers 58, 60. In this example, a single degree is illustrated at each of the OADM nodes 52, 54. Of course, practical implementations may include multiple degrees, each facing a different optical section 50. The WSS 62 is configured to add/drop spectrum to/from the degrees and/or locally. Each OADM node 52, 54 includes a post-amplifier 64 on the transmit side and a pre-amplifier 66 on the receive side. The amplifiers 64, 66 can be Erbium-Doped Fiber Amplifiers (EDFAs). Also, Raman amplifiers may be used as well in addition to EDFAs. The OADM nodes 52, 54 also include an Optical Channel Monitor (OCM) 68 (a.k.a. Optical Power Monitor (OPM), etc.) which is an optical receiver connected (e.g., by a tap) to an output of each of the amplifiers 64, 66. The OCM 68 can have two receivers to simultaneously monitor each of the optical fibers 58, 60 or a switch to allow a single receiver to monitor one of the optical fibers 58, 60 at a time.

The OADM nodes 52, 54 also can include an ASE source 70 coupled to the WSS 62. In newer optical line systems, the ASE source 70 can be used to fill unused spectrum to reduce power optimization time. Here, the ASE source 70 provides so-called channel holders used to fill the optical spectrum on the optical section 50 so that it always appears to have a full-fill configuration. Such an approach significantly reduces capacity change time.

Also, the OADM nodes 52, 54 can include other components 72 such as an OTDR, an OSC, a polarimeter, and a processor. Again, the components 72 are in-situ, i.e., part of the OADM nodes 52, 54. Also, in another embodiment, the components 72 are implemented in a test device or system, such as separate from the OADM nodes 52, 54. In an embodiment, the components 72 can provide a differential delay measurement, an SRS measurement, a fiber 58, 60 effective length ($L_{eff}$) measurement, etc. For example, these measurements are described in commonly-assigned U.S. patent application Ser. No. 15/986,396, filed May 22, 2018, and entitled "Optical fiber characterization measurement systems and methods," the contents of which are incorporated by reference herein. Further, the processor can be used to obtain the measurement data and perform various data analyses described herein. Also, the intermediate optical line amplifier nodes 56 include in-line optical amplifiers 72.

As described herein, the fiber nonlinear skirt measurement can be performed with the ASE source 70 and the WSS 62 causing a two-peak signal to be transmitted on the optical fibers 58, 60 and received by the OCM 68. Referring back to FIGS. 1A and 1B, the graphs 10A, 10B illustrate the transmitted spectral shape in line 12. This spectral shape can be achieved through configuration of the ASE source 70 and the WSS 62. The received spectral shape in line 14 is received by the OCM 68 with the corresponding center dip depth 16 a function of the fiber 58, 60.

Figure 8:
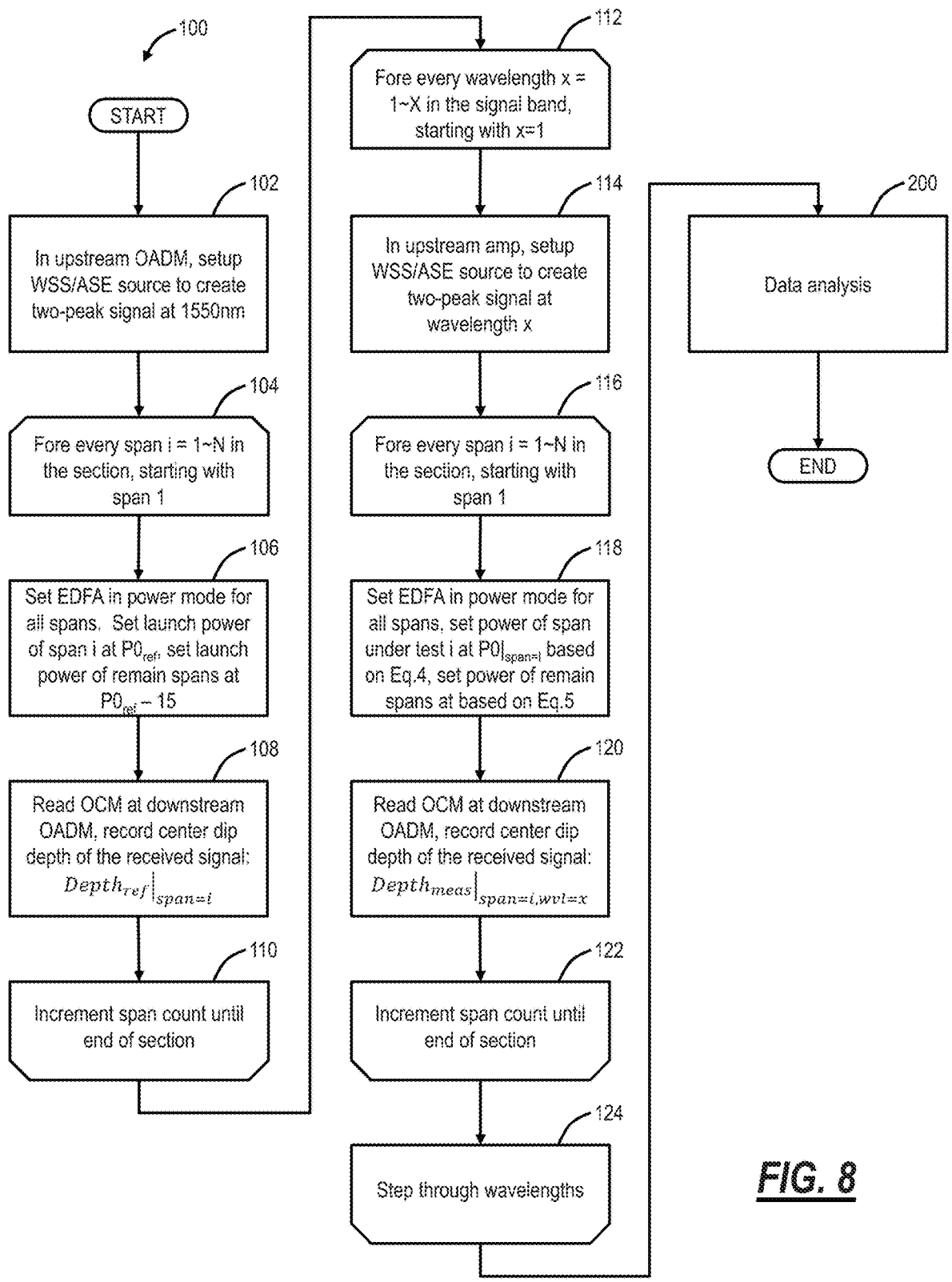
FIG. 8 is a flowchart of a measurement process which can be implemented in the optical section of FIG. 7.

FIG. 8 is a flowchart of a measurement process 100. The measurement process 100 can be implemented in the optical section 50. The measurement process 100 starts with an initial scan at 1550 nm. At the beginning of a network section, e.g., at the upstream OADM, the measurement process 100 includes setting up the WSS 62 to shape the ASE source 70 to create the two-peak signal at 1550 nm (step 102).

For every span i=1~N in the optical section, starting with i=1 (step 104), the measurement process 100 includes setting the optical amplifiers in a power mode for all spans (this power mode setting only needs to be done once, not necessarily for each iteration) and setting signal launching power at a reference power level, $P0_{ref}$ for span i, for example $P0_{ref}$=15 dBm, and setting the rest of the spans at a much lower launching power, for example ($P0_{ref}$-15) (step 106). The measurement process 100 includes reading the OPM 68 at the downstream OADM, and recording the center dip depth of the received signal as $Depth_{ref}|_{span=i}$ (step 108). The span count is incremented and steps 104-110 are repeated until the end of the section (step 110).

The signal broadening effect characterized by $Depth_{ref}|_{span=i}$ is mainly generated by span i with high signal launching power. The purpose of steps 104-110 is to find the launching power for every span to yield the center dip depth around an optimum center dip depth, $Depth_{opt}$. $Depth_{opt}$ is found when the PSD of the nonlinear product at the center gap is much higher than line EDFA ASE noise, while the corresponding in-band nonlinear product is still negligible compared to the signal. $Depth_{opt}$ depends on the width of the signal and the gap of the two peaks. For example, when both the signal and gap width is 50 GHz, $Depth_{opt}$=15 dB. Since the absolute level of Depth changes twice as fast as P0, the launching power for span i=1~N is computed by $$P0|_{span=i} = P0_{ref} + (Depth_{ref}|_{span=i} - Depth_{opt})/2 \text{ (dBm)} \quad (4)$$

The next step is to sweep the signal through the signal band at X points with the optimum signal launching power$P0|_{span=i}$ from Eq. (4). In the upstream OADM, for every wavelength to be tested (step 112), the measurement process 100 includes setting up the WSS/ASE source to create the two-peak signal at wavelength x, x=1~X (step 114).

For every span i=1~N in section (step 116), the measurement process 100 includes setting the optical amplifiers in power mode for all spans (this power mode setting only needs to be done once, not necessarily for each iteration), and setting launch power of span i to $P0|_{span=i}$, such that the center dip depth due to the signal broadening effect of span i is around the pre-defined $Depth_{opt}$. For the rest of the spans j=1~N, j≠i, set launch power to $$P0|_{span=i} = P0_{ref}(Depth_{ref}|_{span=j} - (Depth_{opt} + 20))/2 \text{ (dBm)} \quad (5)$$

such that the center dip depth due to the signal broadening effect of span=j is about 20 dB less than $Depth_{opt}$, and is deemed as negligible in the signal spectrum at the end of section (step 118).

For every span i and wavelength x, the measurement process 100 includes measuring the center dip depth of the received signal with the OCM at the downstream OADM and recorded as $Depth_{meas|span=i,wvl=x}$ (step 120). Steps 112-120 are repeated for all spans and wavelengths (steps 122, 124). Finally, the measurement process 100 has all required data measurements and can proceed to data analysis which is described in processes 200A, 200B, 200C.

Figure 9A:
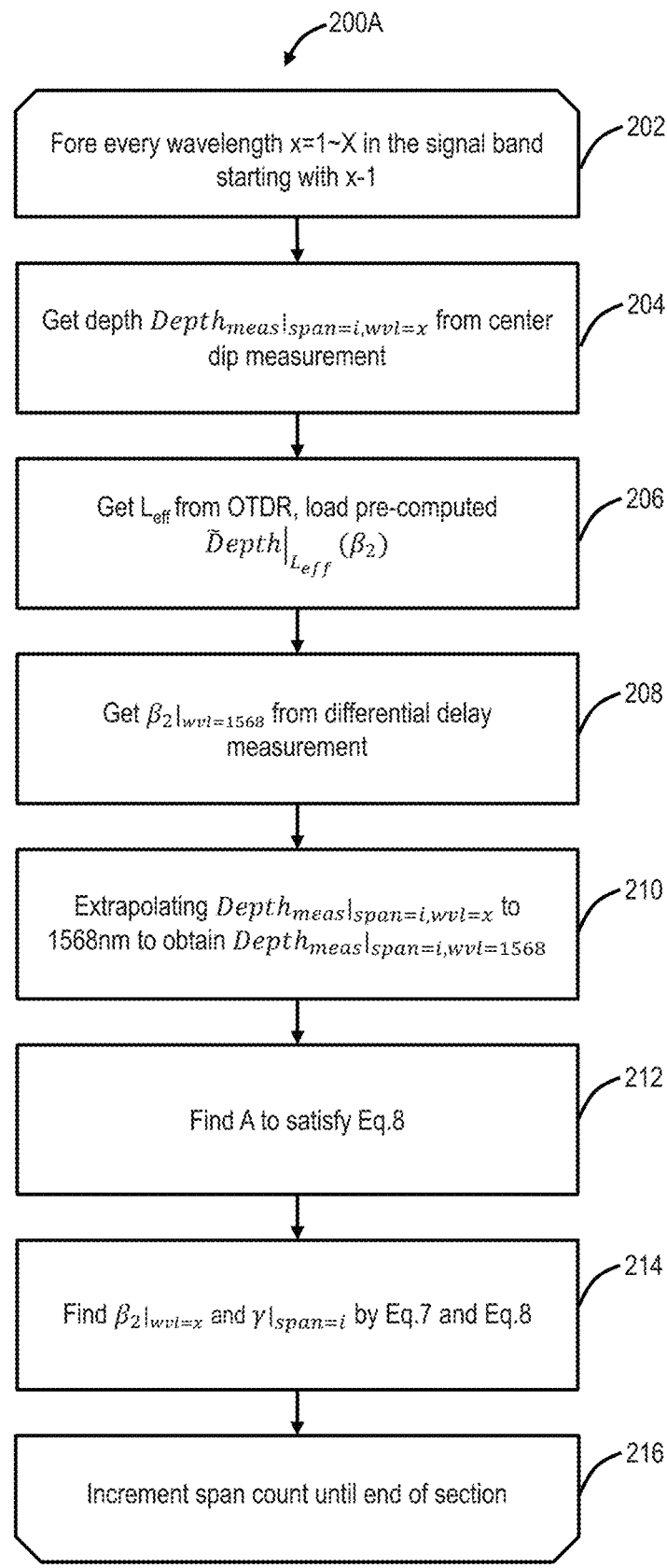
FIG. 9A is a flowchart of a data analysis process which also uses a differential delay measurement.
Figure 9B:
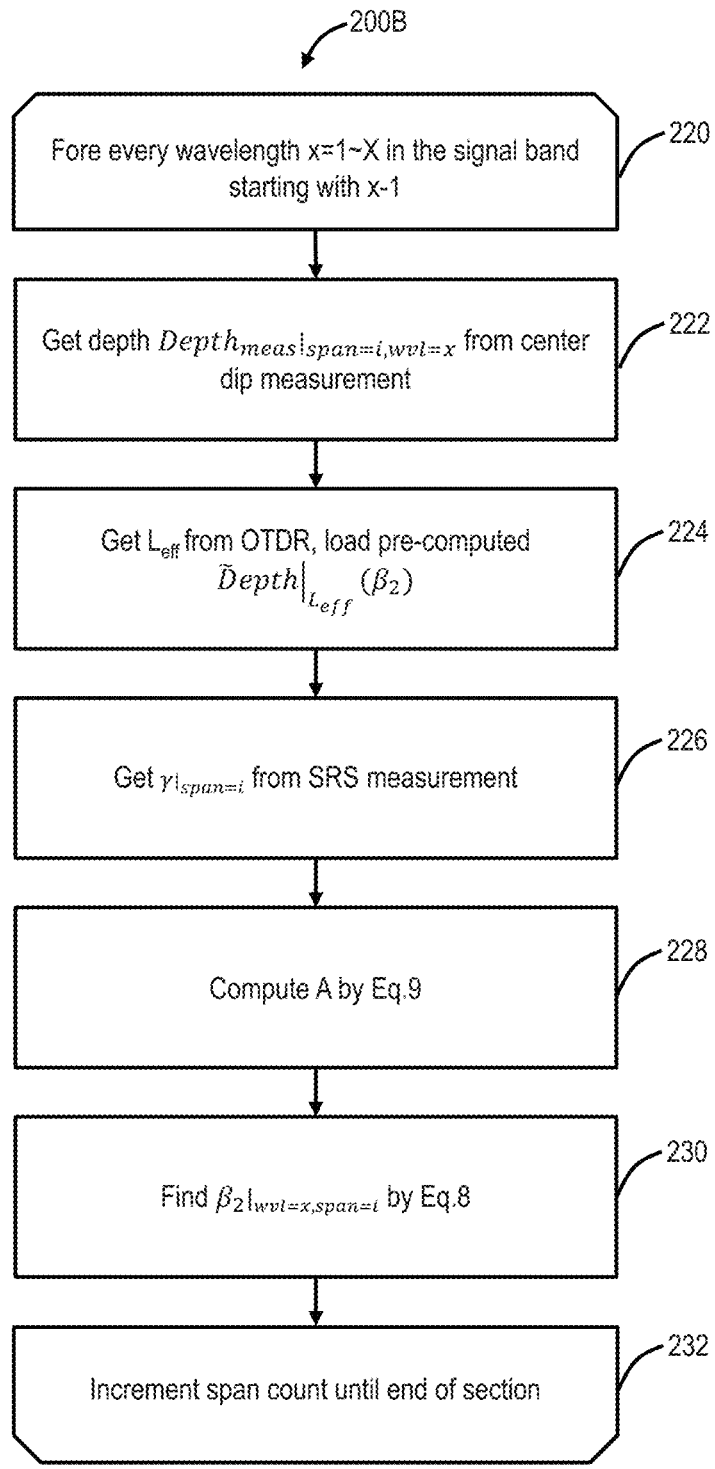
FIG. 9B is a flowchart of a data analysis process which uses an SRS measurement.
Figure 9C:
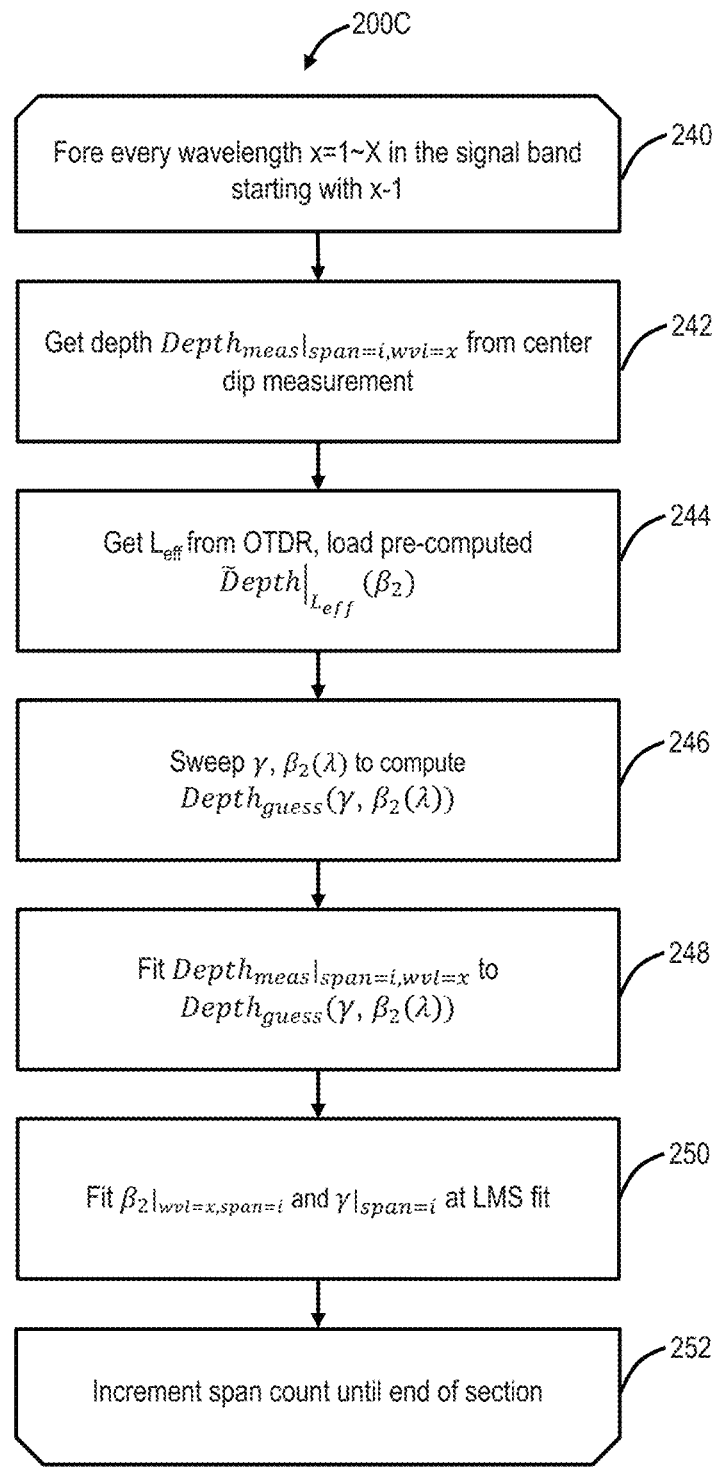
FIG. 9C is a flowchart of a data analysis process which sweeps dispersion, dispersion slope and $\gamma$.

FIG. 9A is a flowchart of a data analysis process 200A which also uses a differential delay measurement, FIG. 9B is a flowchart of a data analysis process 200B which uses an SRS measurement, and FIG. 9C is a flowchart of a data analysis process 200C which sweeps dispersion, dispersion slope and γ. Each of the processes 200A, 200B, 200C can be performed in a processor at the OADM nodes 52, 54, in a management system, or the like.

In FIG. 9A, the data analysis process 200A utilizes dispersion data at 1568 nm from a differential delay measurement such as from an OSC at 1510 nm and an OTDR at 1625 nm. This dispersion data is utilized in addition to data from the measurement process 100.

The data analysis process 200A, for each span i=1~N at each measured wavelength, x=1~X (step 202), includes loading measurement results from center dip depth measurement $\text{Depth}_{meas|wvl-x,span-i}$, for each span i=1~N at each measured wavelength, x=1~X (step 204). The data analysis process 200A includes getting the measured dispersion at 1568 nm from the differential delay measurement, denoted as $\beta_2|_{wvl=1568,span=i}$ (step 208); as well as the effective length, $L_{eff}$, from an OTDR measurement (step 206). Then, the data analysis process 200A includes loading the pre-computed normalized center dip depth as a function $\beta_2$ at the measured $L_{eff|span-i}$, denoted as $\tilde{\text{Depth}}|_{L_{eff}}(\beta_2)$.

Next, the data analysis process 200A includes scaling $\tilde{\text{Depth}}|_{L_{eff}}(\beta_2)$ to $\text{Depth}_{meas|wvl-x,span-i}$, by extrapolating $\text{Depth}_{meas|wvl-x,span-i}$ to $\text{Depth}|_{wvl-1568,span-i}$ (step 210) and finding A to satisfy Eq. (6) (step 212):

$$\text{Depth}_{meas|wvl=1568,span=i} = \tilde{\text{Depth}}|_{L_{eff}}(\beta_2|_{wvl=1568,span=i}) + A + c \quad (6)$$

Next, the data analysis process 200A, from Eq. 3, includes determining γ is by $$\gamma = 10^{0.1*(A/2-P0|_{span=i})} \quad (7)$$

and $\beta_2$ of the fiber at each measured wavelength, $\beta_2|_{wvl=x,span=i}$, by $$\beta_2|_{wvl=x,span=i} = \tilde{\text{Depth}}|_{L_{eff}}^{-1}(\text{Depth}_{meas|wvl=x,span=i} - A - c) \quad (8)$$

Where $\tilde{\text{Depth}}|_{L_{eff}}^{-1}()$ is the inverse function of $\tilde{\text{Depth}}|_{L_{eff}}()$ (step 214). The data analysis process 200A loops through every span in the section (step 216).

In FIG. 9B, the data analysis process 200B incorporates an SRS measurement. The data analysis process 200B, for each span i=1~X at each measured wavelength x=1~X (step 220); starts with loading results from center dip depth measurement, $\text{Depth}_{meas}|_{wvl-x,span-i}$ (step 222), loading $\tilde{\gamma}|_{span-i}$ from SRS measurement (step 226), and pre-computed $\tilde{\text{Depth}}|_{L_{eff}}(\beta_2)$ at OTDR measured $L_{eff}|_{span-i}$ (step 224). The scaling factor A can be found by (step 228)

$$A = 2P0|_{span=i} + 20 \log 10(\gamma|_{span=i}) \quad (9)$$

Then, $\beta_2$ of the fiber at each measured wavelength, $\beta_2|_{wvl=x,span=i}$, is found by Eq (8) (step 230). The data analysis process 200B loops through every span in the section (step 232).

In FIG. 9C, the data analysis process 200C sweeps dispersion, dispersion slope and γ to scale $\tilde{\text{Depth}}|_{L_{eff}}(\beta_2)$ to a guessed $\text{Depth}_{guess}(\gamma,\beta_2(\lambda))$ based on Eq. (3). The data analysis process 200C, for each span i=1~N at each measured wavelength x=1~X (step 240), starts with loading results from center dip depth measurement, $\text{Depth}_{meas}|_{wvl-x,span-i}$ (step 242), and pre-computed $\tilde{\text{Depth}}|_{L_{eff}}(\beta_2)$ at OTDR measured $L_{eff}|_{span-i}$ (step 244). The data analysis 200C sweeps dispersion, dispersion slope and γ to scale $\tilde{\text{Depth}}|_{L_{eff}}(\beta_2)$ to a guessed $\text{Depth}_{guess}(\gamma,\beta_2(\lambda))$ (step 246). By comparing $\text{Depth}_{guess}(\gamma,\beta_2(\lambda))$ with the measured $\text{Depth}_{meas}|_{wvl-x}$, $\gamma|_{span-i}$ and $\beta_2|_{wvl=x,span=i}$ are found at Least Mean Square (LMS) fit (steps 248, 250). The data analysis process 200C loops through every span in the section (step 252).

In an embodiment, the measurement technique described herein with a two-peak ASE signal can be used to characterize optical amplifiers. For example, next-generation optical amplifiers with higher output power can have tighter Four-Wave Mixing (FWM) specifications. The various measurement techniques described herein work well to characterize this effect. For example, conventionally, the FWM specification of amplifiers was verified in the factory and lab using a specified measurement technique with two CW lasers (which also means single polarization) that had to be polarization controlled (scanned) to search for a peak interaction, with fixed spacing between the CW lasers which could not be widened because of polarization evolution, such that the walk-off could not be measured. This approach was only valid for FWM tones of 50 GHz narrow single polarization sources. This is not representative of the Nonlinear (NL) impact on wider, dual-polarization, coherent transceivers or modems.

The measurement technique employed here uses two-peaks of ASE and has the following benefits 1) ASE more accurately represents spectrally shaped dual-polarization coherent signals, 2) this eliminates the strong polarization hole burning that contaminates the CW approach, 3) the peak separation can be varied to get a direct measurement of walk-off, and 4) it is easy to create multiple peaks to get a full-fill representative G(length) FWM measurement.

Figure 10:
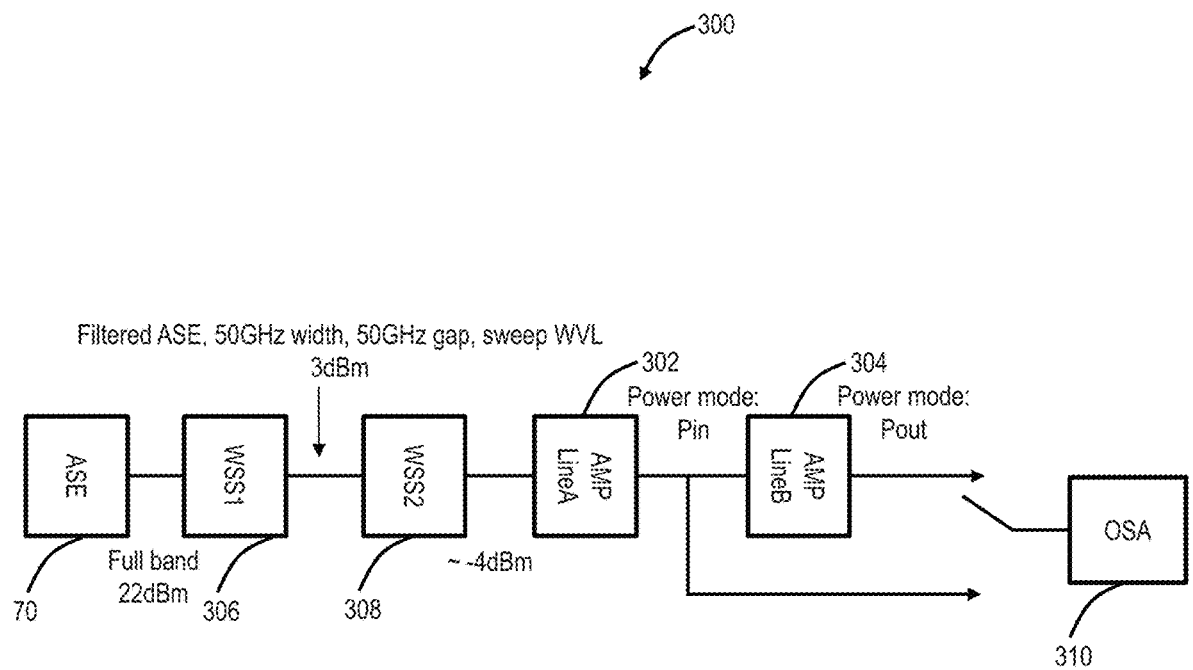
FIG. 10 is a block diagram of a system for characterizing optical amplifiers utilizing the two-peak ASE signal.

FIG. 10 is a block diagram of a system 300 for characterizing optical amplifiers 302, 304 utilizing the two-peak ASE signal. The system 300 includes the ASE source 70 which is connected to the optical amplifiers 302, 304, such as via WSSs 306, 308 (or a single WSS). An Optical Spectrum Analyzer (OSA) 310 can be selectively connected to an output of the amplifier 302 and the amplifier 304.

A measurement process utilizing the system 300 can include creating a two-peak ASE signal with the ASE source 70 and the WSSs 306, 308, sending the two-peak ASE signal to the amplifiers 302, 304, and measuring the outputs of the amplifiers 302, 304 with the OSA 310. Here, and in the section 50, the WSSs can be configured to set attenuation to even the power of the two-peaks in the two-peak ASE signal.

First, the optical amplifier 302 can have its Total Output Power (TOP) adjusted to normalize signal power to a first frequency tested (e.g., 187000 GHz) and an OSA trace can be recorded. Next, the optical amplifier 304 can have its Total Output Power (TOP) adjusted to normalize signal power to a first frequency tested (e.g., 187000 GHz) and an OSA trace can be recorded after calibration. The OSA trace can be recorded at the output of the optical amplifier 304 with stepping signal frequent and TOP of either amplifier 302, 304.

Figure 11A:
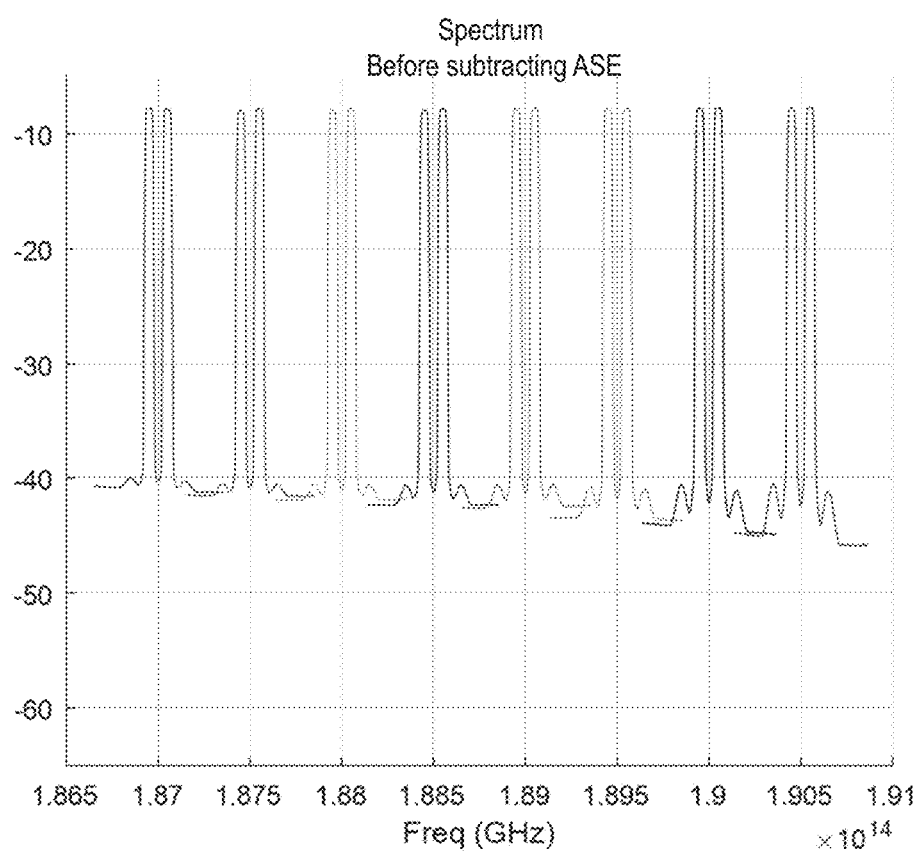
FIG. 11A is a graph of optical spectrum in the system before subtracting ASE.
Figure 11B:
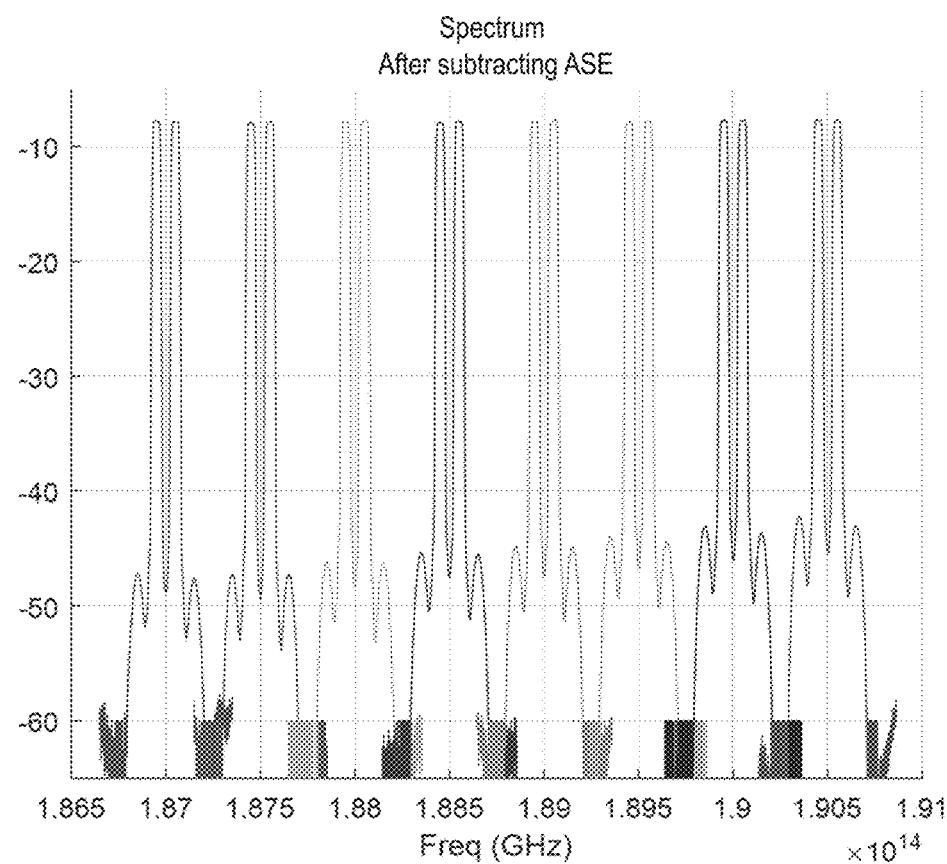
FIG. 11B is a graph of optical spectrum in the system after subtracting ASE.
Figure 11C:
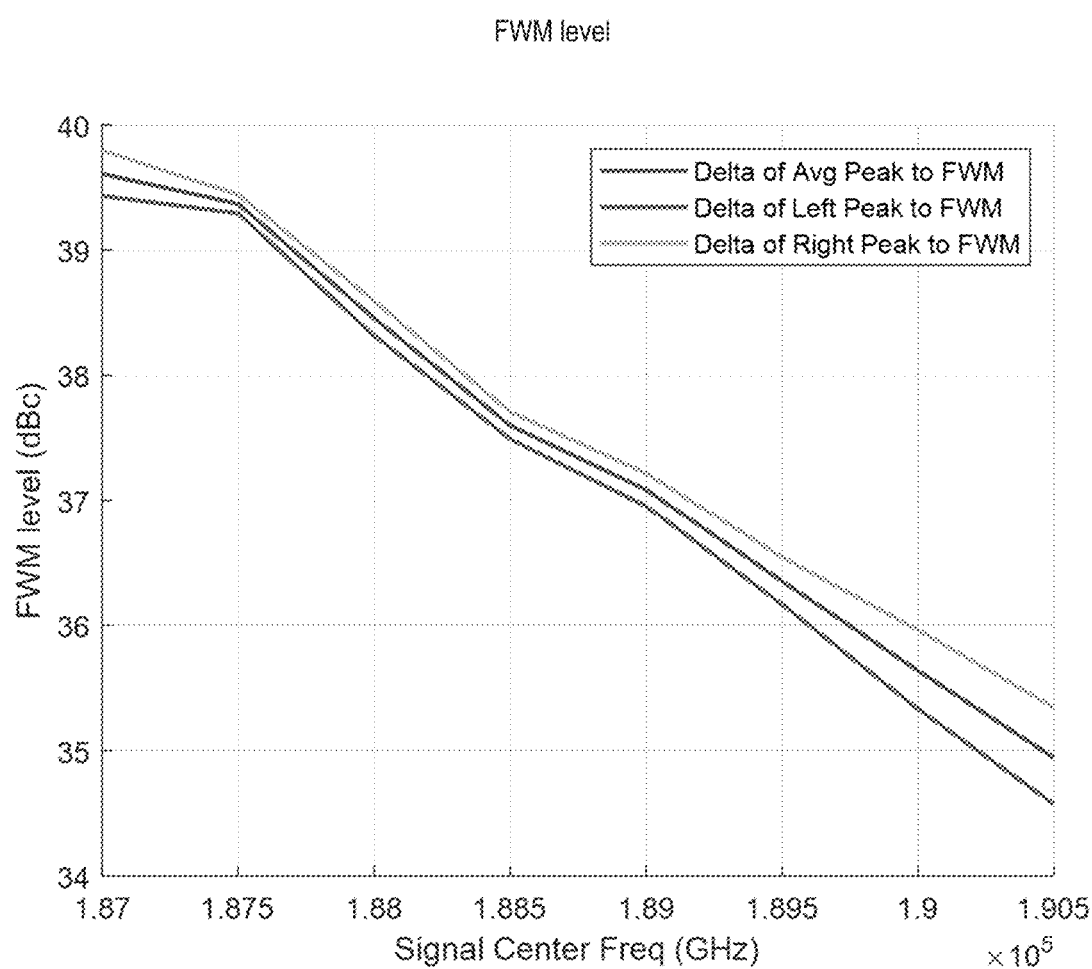
FIG. 11C is a graph of FWM level versus signal center frequency.

FIG. 11A is a graph of optical spectrum in the system 300 before subtracting ASE, FIG. 11B is a graph of optical spectrum in the system 300 after subtracting ASE, and FIG. 11C is a graph of FWM level versus signal center frequency.

Figure 12:
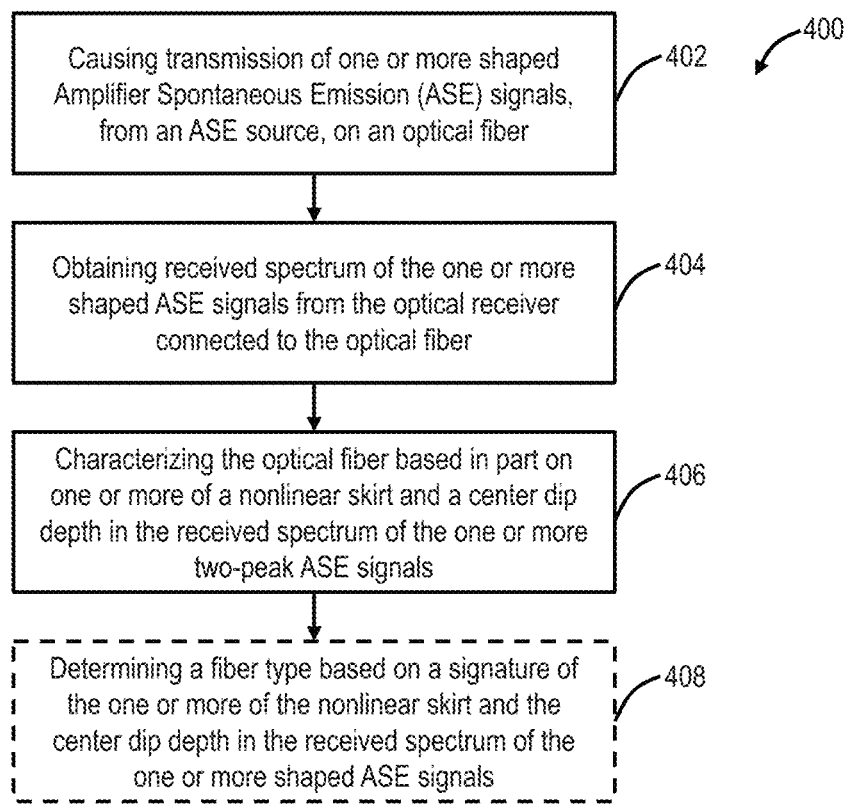
FIG. 12 is a flowchart of a process for fiber characterization.

FIG. 12 is flowchart of a process 400 for fiber characterization. The process 400 includes causing transmission of one or more shaped Amplified Spontaneous Emission (ASE) signals, from an ASE source, on an optical fiber (step 402); obtaining received spectrum of the one or more shaped ASE signals from the optical receiver connected to the optical fiber (step 404); and characterizing the optical fiber based in part on one or more of a nonlinear skirt and a center dip depth in the received spectrum of the one or more two-peak ASE signals (step 406). The process 400 can also include determining a fiber type based on a signature of the one or more of the nonlinear skirt and the center dip depth in the received spectrum of the one or more shaped ASE signals (step 408). In another embodiment, the process 400 can have the step 402 be completed separately and the obtaining step 404 can be performed responsive to another device causing the transmission. For example, the process 400 here could be performed by a management system or the like that receives the spectrum of the one or more shaped ASE signals. The transmission or the causing of such transmission can be performed by an optical network element or node. The received spectrum by the optical network element or node can be provided to the processor or other apparatus implementing the process 400.

The one or more shaped ASE signals can be formed by the ASE source communicatively coupled to a Wavelength Selective Switch (WSS) that is configured to shape ASE from the ASE source to form the one or more shaped ASE signals with one or more peaks and with associated frequency. The one or more shaped ASE signals can have two distinct peaks at the transmission with a significant dip at a center frequency, and the received spectrum of the one or more two-peak ASE signals has much less of a dip that the center dip depth. The optical fiber can be characterized to determine chromatic dispersion, $\beta_2$, and fiber nonlinear coefficient, $\gamma$. The chromatic dispersion, $\beta_2$, and the fiber nonlinear coefficient, $\gamma$ can be characterized by a measurement of a shape of the one or more of the nonlinear skirt and the center dip depth as a function of signal wavelength.

The one or more shaped ASE signals can include a plurality of shaped ASE signals with a first set of shaped ASE signals utilized to determine launch power for every span in a section to yield an optimum center dip depth, and a second set of shaped ASE signals that sweep at different frequencies across a signal band to determine a corresponding center dip depth at the different frequencies. The optical fiber can be characterized based in part on a shape of the one or more of the nonlinear skirt and the center dip depth and a separate differential delay measurement, to determine group velocity dispersion parameter, $\beta_2$, and fiber nonlinear coefficient, $\gamma$. The optical fiber can be characterized based in part on a shape of the one or more of the nonlinear skirt and the center dip depth and a separate Stimulated Raman Scattering (SRS) measurement, to determine group velocity dispersion parameter, $\beta_2$, and fiber nonlinear coefficient, $\gamma$. The optical fiber can be characterized based in part on a shape of the one or more of the nonlinear skirt and the center dip depth and a Least Mean Square (LMS) fit, to determine group velocity dispersion parameter, $\beta_2$, and fiber nonlinear coefficient, $\gamma$.

Figure 13:
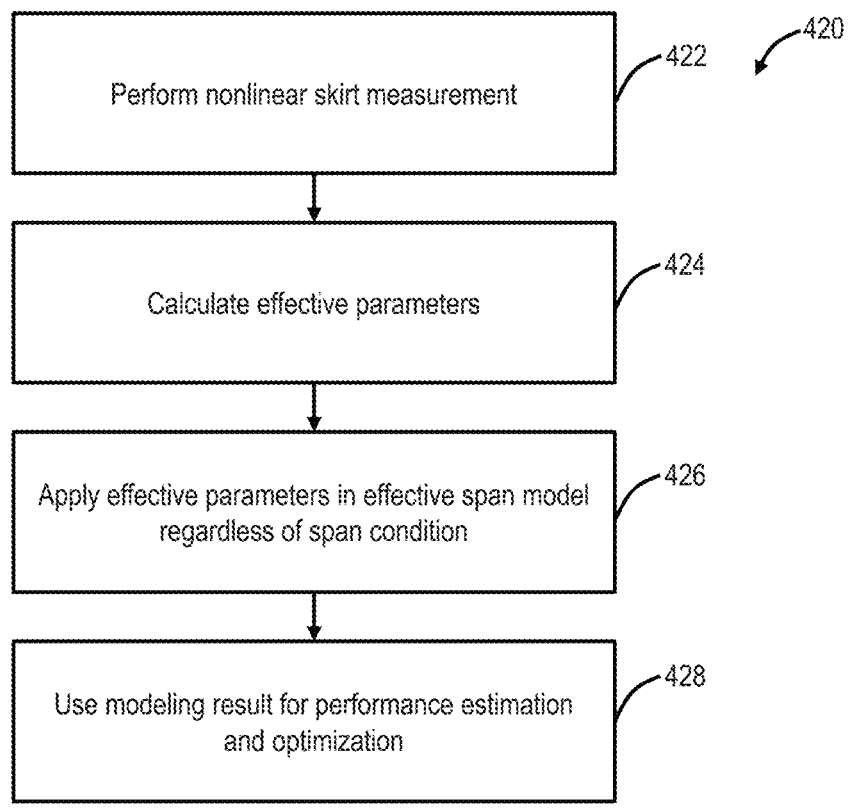
FIG. 13 is a flowchart of a process for effective fiber parameter characterization and effective span modeling.

FIG. 13 is a flowchart of a process 420 for effective fiber parameter characterization and effective span modeling. First, the in-situ nonlinear skirt measurement is performed (step 422). Next, the calculation of the fiber parameters are the same described herein, but instead of characterizing the normal fiber parameters, $\beta_2$ and $\gamma$, this step calculates the generalized effective parameters, $\beta_{2,eff}$ and $\gamma_{eff}$, to cover any effects from change of fiber types and lumped losses (step 424). The effective parameters can be applied to the effective span model for transmission performance estimation (step 426). The effective span performance is modeled by span incremental Signal to Noise Ratio, $\Delta SNR_{span}$, as expressed in Eq. (10):

$$\frac{1}{\Delta SNR_{span}} = \frac{1}{SNR_{linear}} + \frac{1}{SNR_{NL}} \qquad (10)$$

$SNR_{linear}$ is linear Signal to Noise Ratio (SNR) from Amplifier ASE, which is a function of total span loss $\alpha_{tot}$ including fiber loss and lumped loss, output power of the EDFA from the previous fiber span, $P_0$, and amplifier noise figure, NF.

All the parameters for backing out $SNR_{linear}$ are readily available in photonic systems. For example, $P_0$ can be read from the EDFA output power monitor; $\alpha_{tot}$ can be calculated from the delta between $P_0$ and the input power of the downstream EDFA; measurement of EDFA NF is characterized during manufacturing of EDFAs and is usually stored and accessible in the memory of EDFA card, or statistical data would be available from the EDFA manufacturer.

The effective parameters, $\beta_{2,eff}$ and $\gamma_{eff}$, are used in the calculation of nonlinear SNR, $SNR_{NL}$, which could take a form similar to that shown in Eq. (11):

$$SNR_{NL} = \frac{1}{\frac{16}{27}\gamma_{eff}^2 P_0^2 g_{NL}(v, \beta_{2,eff})} \qquad (11)$$

where $g_{NL}(\bullet)$ is the normalized power spectral density of nonlinear noise which can be obtained by different methods, for example GN model as described in Eq (1) It is also noticed that lumped losses information is not required for $SNR_{linear}$ and $SNR_{NL}$, because it is already included in $\alpha_{tot}$, $\beta_{2,eff}$ and $\gamma_{eff}$.

Figure 14:
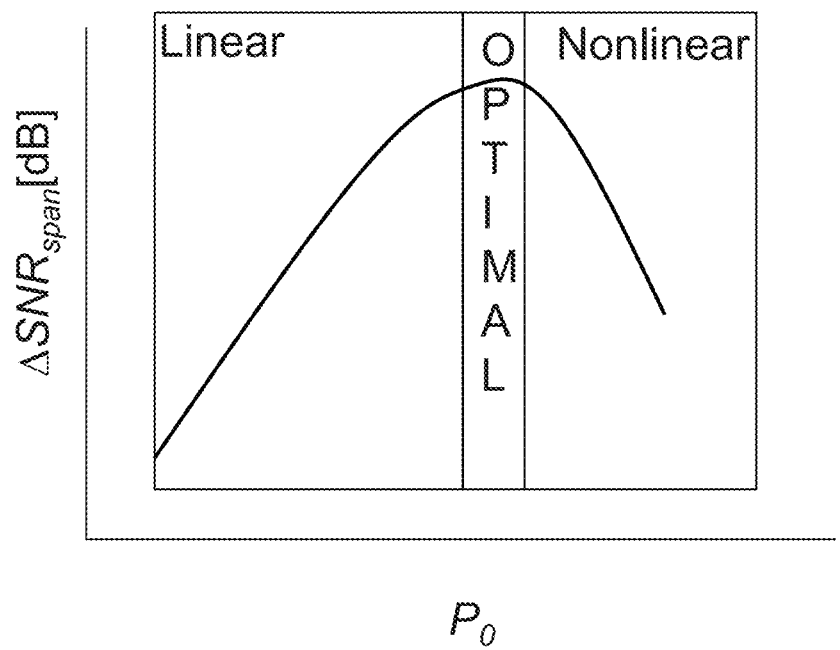
FIG. 14 is a graph of the relationship between $\Delta SNR_{span}$ and $P_0$ for the process of FIG. 13.

Based on Eq. (10)~(11), the relationship between $\Delta SNR_{span}$ and $P_0$ can be plotted as illustrated in FIG. 14. Therefore, in step 428, the span transmission performance can be optimized by configuring $P_0$ at the maximum $\Delta SNR_{span}$. The estimated transmission performance can be obtained at the same time.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising steps of:
    performing an in-situ measurement of a fiber via an Amplified Spontaneous Emission (ASE) source connected to a Wavelength Selective Switch (WSS) of an Optical Add/Drop Multiplexing (OADM) node;
    determining effective parameters, including effective chromatic dispersion $\beta_{2,eff}$ and effective fiber nonlinear coefficient $\gamma_{eff}$, from the in-situ measurement; and
    utilizing the effective parameters for any of modeling, link budgeting and performance optimization, of the fiber.

2. The method of claim 1, wherein the fiber includes any of mixed fiber types and unknown lumped losses.

3. The method of claim 1, wherein the steps include utilizing the effective parameters for calculating nonlinear Signal-to-Noise Ratio ($SNR_{NL}$).

4. The method of claim 1, wherein the in-situ measurement includes monitoring nonlinear broadening effects in received spectrum from shaped Amplified Spontaneous Emission (ASE) signals.

5. The method of claim 1, wherein the steps include determining a fiber type of the fiber based on a signature in results of the in-situ measurement.

6. The method of claim 1, wherein the fiber includes multiple spans in an optical network.

7. The method of claim 1, wherein the fiber includes patch panel connections therein.

8. A non-transitory computer-readable medium comprising instructions that, when executed, cause one or more processors to perform steps of:
    causing performance of an in-situ measurement of a fiber via an Amplified Spontaneous Emission (ASE) source connected to a Wavelength Selective Switch (WSS) of an Optical Add/Drop Multiplexing (OADM) node;
    determining effective parameters, including effective chromatic dispersion $\beta_{2,eff}$ and effective fiber nonlinear coefficient $\gamma_{eff}$, from the in-situ measurement; and
    utilizing the effective parameters for any of modeling, link budgeting and performance optimization, of the fiber.

9. The non-transitory computer-readable medium of claim 8, wherein the fiber includes any of mixed fiber types and unknown lumped losses.

10. The non-transitory computer-readable medium of claim 8, wherein the steps include
    utilizing the effective parameters for calculating nonlinear Signal-to-Noise Ratio ($SNR_{NL}$).

11. The non-transitory computer-readable medium of claim 8, wherein the in-situ measurement includes monitoring nonlinear broadening effects in received spectrum from shaped Amplified Spontaneous Emission (ASE) signals.

12. The non-transitory computer-readable medium of claim 8, wherein the steps include
    determining a fiber type of the fiber based on a signature in results of the in-situ measurement.

13. The non-transitory computer-readable medium of claim 8, wherein the fiber includes multiple spans in an optical network.

14. The non-transitory computer-readable medium of claim 8, wherein the fiber includes patch panel connections therein.

15. An Optical Add/Drop Multiplexing (OADM) node comprising:
    a Wavelength Selective Switch (WSS) communicatively coupled to a fiber;
    an Amplified Spontaneous Emission (ASE) source communicatively coupled to the WSS; and
    a processor configured to
        cause performance of an in-situ measurement of the fiber via the ASE source and the WSS,
        determine effective parameters, including effective chromatic dispersion $\gamma_{2,eff}$ and effective fiber nonlinear coefficient $\gamma_{eff}$, from the in-situ measurement, and
        utilize the effective parameters for any of modeling, link budgeting and performance optimization, of the fiber.

16. The OADM node of claim 15, wherein the fiber includes any of mixed fiber types and unknown lumped losses.

17. The OADM node of claim 15, wherein the processor is configured to
    utilize the effective parameters for calculating nonlinear Signal-to-Noise Ratio ($SNR_{NL}$).

18. The OADM node of claim 15, wherein the in-situ measurement includes monitoring nonlinear broadening effects in received spectrum from shaped ASE signals.

19. The OADM node of claim 15, wherein the processor is configured to
    determine a fiber type of the fiber based on a signature in results of the in-situ measurement.

20. The OADM node of claim 15, wherein the fiber includes multiple spans in an optical network.

* * * * *

UNITED STATES PATENT AND TRADEMARK OFFICE
CERTIFICATE OF CORRECTION

| | |
|---|---|
| PATENT NO. | : 11,799,546 B2 |
| APPLICATION NO. | : 17/437635 |
| DATED | : October 24, 2023 |
| INVENTOR(S) | : Yinqing Pei, David W. Boertjes and Alex W. MacKay |

It is certified that error appears in the above-identified patent and that said Letters Patent is hereby corrected as shown below:

On the Title Page

The inventorship at Item (72) should appear as follows:
(72) Inventors: Yinqing Pei, Kanata (CA); David W. Boertjes, Nepean (CA); Alex W. MacKay, Ottawa (CA)

Signed and Sealed this
Thirtieth Day of January, 2024

Katherine Kelly Vidal
*Director of the United States Patent and Trademark Office*